(12) United States Patent
Sato et al.

(10) Patent No.: US 10,518,270 B2
(45) Date of Patent: Dec. 31, 2019

(54) DUST COLLECTOR AND AIR CONDITIONER

(71) Applicant: KABUSHIKI KAISHA TOSHIBA, Tokyo (JP)

(72) Inventors: Yosuke Sato, Kanagawa (JP); Akio Ui, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 313 days.

(21) Appl. No.: 15/440,981

(22) Filed: Feb. 23, 2017

(65) Prior Publication Data
US 2018/0078950 A1 Mar. 22, 2018

(30) Foreign Application Priority Data
Sep. 20, 2016 (JP) .................. 2016-183461

(51) Int. Cl.
| | |
|---|---|
| *B03C 3/47* | (2006.01) |
| *B03C 3/12* | (2006.01) |
| *B03C 3/41* | (2006.01) |
| *B03C 3/36* | (2006.01) |
| *B03C 3/64* | (2006.01) |
| *B03C 3/017* | (2006.01) |
| *B03C 3/08* | (2006.01) |

(Continued)

(52) U.S. Cl.
CPC ............ *B03C 3/47* (2013.01); *B03C 3/017* (2013.01); *B03C 3/08* (2013.01); *B03C 3/12* (2013.01); *B03C 3/155* (2013.01); *B03C 3/368* (2013.01); *B03C 3/41* (2013.01); *B03C 3/64* (2013.01); *F24F 3/166* (2013.01); *B03C 2201/06* (2013.01); *B03C 2201/10* (2013.01); *F24F 2003/1682* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,891,415 A | * | 6/1975 | Watanabe ................. | B03C 3/12 96/53 |
| 3,958,962 A | * | 5/1976 | Hayashi .................... | B03C 3/08 96/97 |

(Continued)

FOREIGN PATENT DOCUMENTS

| | | |
|---|---|---|
| JP | S61-37249 U | 3/1986 |
| JP | 5-68912 | 3/1993 |

(Continued)

*Primary Examiner* — Christopher P Jones
*Assistant Examiner* — Sonji Turner
(74) *Attorney, Agent, or Firm* — Finnegan, Henderson, Farabow, Garrett & Dunner, L.L.P.

(57) ABSTRACT

A dust collector in an embodiment includes: a discharge electrode having tips; a counter electrode including a plurality of conductor plates each having an end opposed to the discharge electrode and arrange side by side in a plate thickness direction; and a power supply that applies voltage between the discharge electrode and the counter electrode. The counter electrode has a first region closer to the tips and a second region farther from the tips than the first region, and at least one of an interval, a distance from the tips, and a shape of at least part of ends in the first region is different from an interval, a distance, or a shape in the second region.

11 Claims, 17 Drawing Sheets

(51) Int. Cl.
*B03C 3/155* (2006.01)
*F24F 3/16* (2006.01)

(56) References Cited

U.S. PATENT DOCUMENTS

| | | | | |
|---|---|---|---|---|
| 4,133,652 A * | 1/1979 | Ishikawa | ................ | B03C 3/017 422/4 |
| 4,643,745 A * | 2/1987 | Sakakibara | ............... | B03C 3/12 96/76 |
| 4,673,416 A * | 6/1987 | Sakakibara | ............... | B03C 3/12 96/79 |
| 4,689,056 A * | 8/1987 | Noguchi | ................... | B03C 3/12 96/79 |
| 5,456,741 A * | 10/1995 | Takahara | ................. | B03C 3/12 95/6 |
| 5,466,279 A * | 11/1995 | Hattori | ..................... | B03C 3/12 29/25.01 |
| 5,547,496 A | 8/1996 | Hara | | |
| 6,133,680 A * | 10/2000 | Lo | ............................ | B03C 3/41 313/309 |
| 6,187,271 B1 * | 2/2001 | Lee | .......................... | A61L 9/22 422/121 |
| 6,506,238 B1 * | 1/2003 | Endo | ........................ | B03C 3/12 96/79 |
| 6,635,106 B2 * | 10/2003 | Katou | ...................... | B03C 3/12 96/67 |
| 7,077,890 B2 * | 7/2006 | Botvinnik | ................ | B03C 3/08 96/69 |
| 7,238,225 B2 * | 7/2007 | Hong | ........................ | B03C 3/47 96/69 |
| 7,368,002 B2 * | 5/2008 | McDonnell | .............. | B03C 3/30 96/39 |
| 7,621,984 B2 * | 11/2009 | Cowie | ...................... | B03C 3/08 96/41 |
| 7,722,707 B2 * | 5/2010 | Tanaka | ..................... | A61L 9/16 96/57 |
| 7,875,104 B2 * | 1/2011 | Cowie | ...................... | B03C 3/08 96/39 |
| 8,454,733 B2 * | 6/2013 | Tanaka | ..................... | B03C 3/08 96/77 |
| 8,454,734 B2 * | 6/2013 | Haruna | ..................... | B03C 3/08 96/77 |
| 8,617,298 B2 * | 12/2013 | Nakahara | .................. | B03C 3/08 96/69 |
| 8,628,606 B2 * | 1/2014 | Hodgson | ............... | F01N 3/0275 55/385.3 |
| 8,690,998 B2 | 4/2014 | Ji et al. | | |
| 9,457,118 B2 * | 10/2016 | Ota | .......................... | B03C 3/09 |
| 2004/0123739 A1 | 7/2004 | Jan | | |
| 2006/0227493 A1 * | 10/2006 | Kim | .......................... | B03C 3/41 361/231 |
| 2008/0120989 A1 * | 5/2008 | Tanaka | ..................... | A61L 9/16 62/407 |
| 2010/0251894 A1 * | 10/2010 | Tanaka | ..................... | B03C 3/08 96/17 |
| 2015/0174587 A1 | 6/2015 | Wei et al. | | |
| 2017/0341087 A1 * | 11/2017 | Yuge | ..................... | B03C 3/025 |

FOREIGN PATENT DOCUMENTS

| | | | |
|---|---|---|---|
| JP | H7-27910 U | | 5/1995 |
| JP | 9-248487 | | 9/1997 |
| JP | 11-221487 | | 8/1999 |
| JP | 2000-51735 A | | 2/2000 |
| JP | 3358008 | | 10/2002 |
| JP | 2003-90554 | | 3/2003 |
| JP | 2007-289832 | | 11/2007 |
| JP | 2008-539067 A | | 11/2008 |
| JP | 2010063966 A | * | 3/2010 |
| JP | 2014-147869 | | 8/2014 |
| JP | 2015-66509 | | 4/2015 |
| JP | 2015-87021 | | 5/2015 |
| JP | 2016090203 A | * | 5/2016 |
| WO | WO 2006/135353 A1 | | 12/2006 |

* cited by examiner

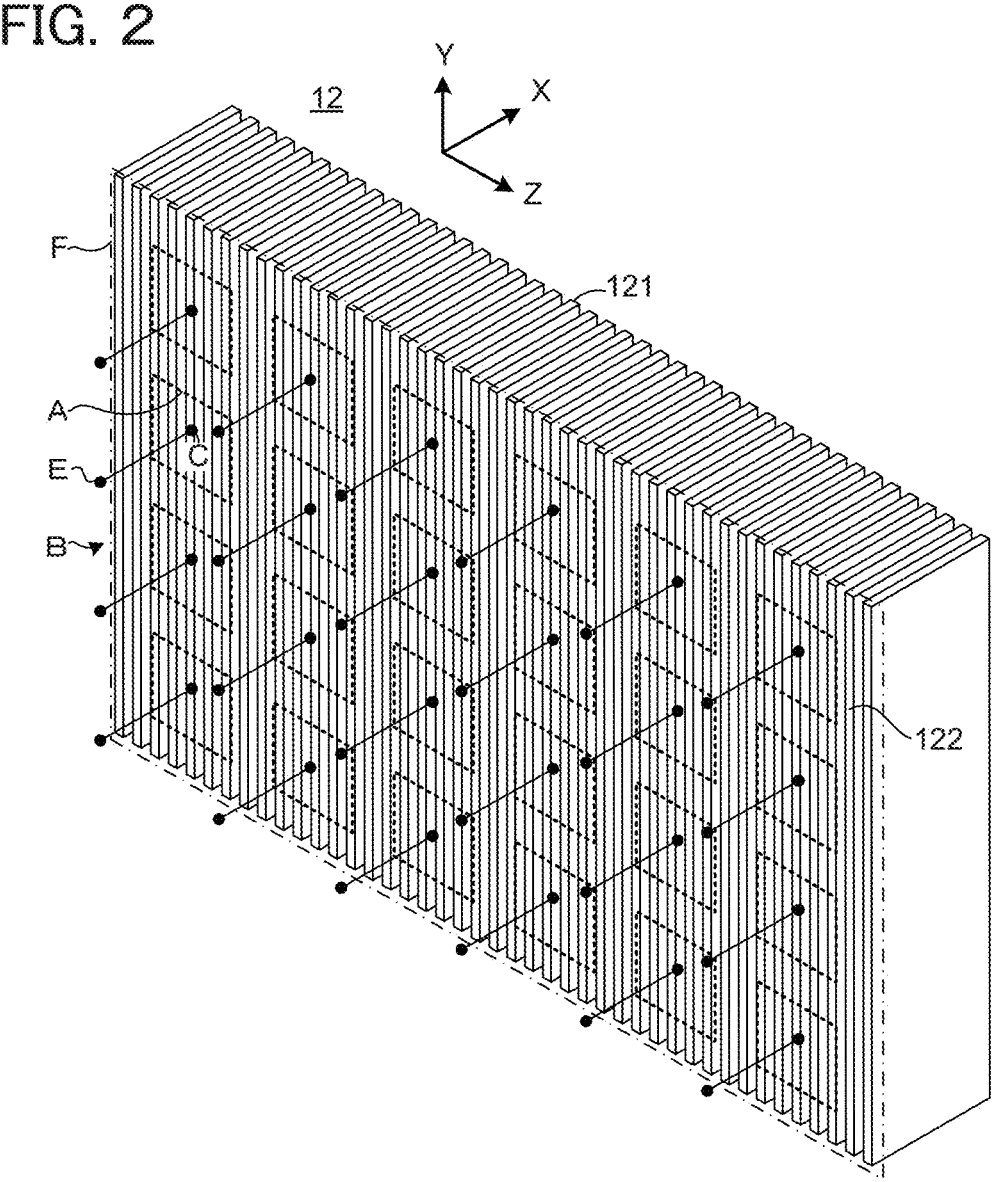

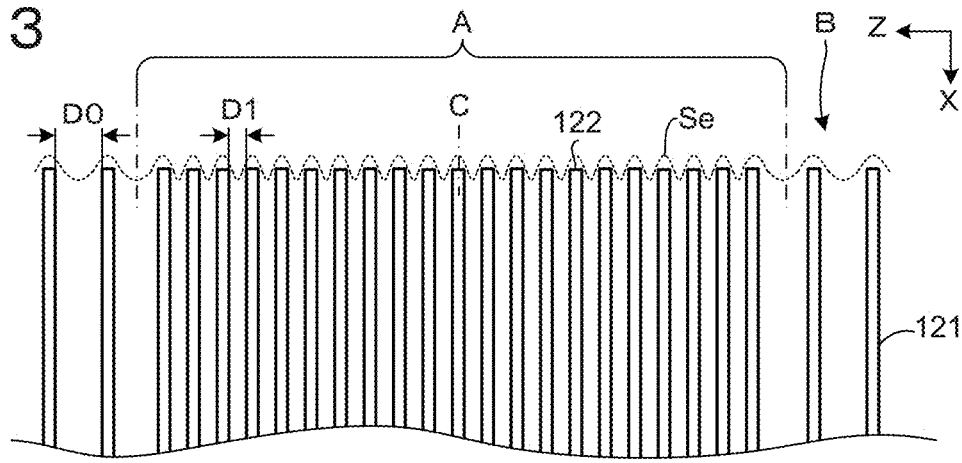
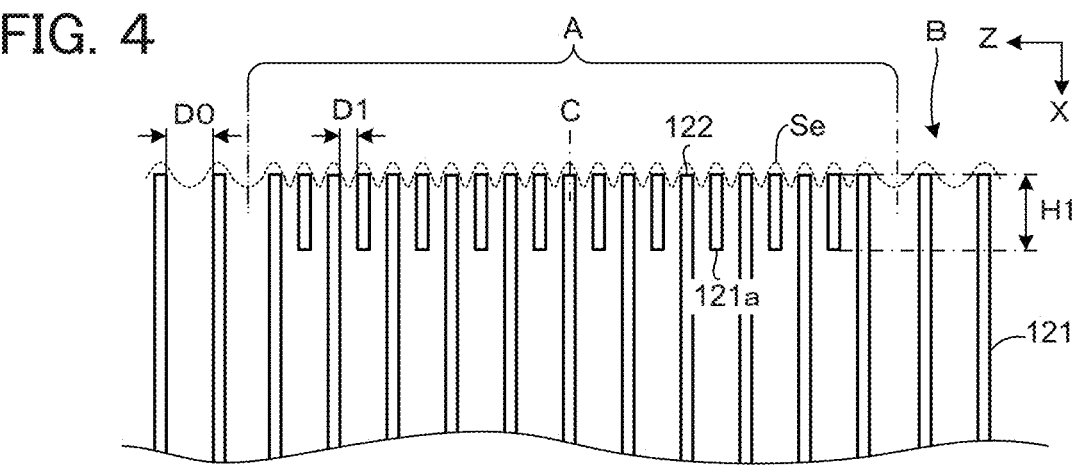
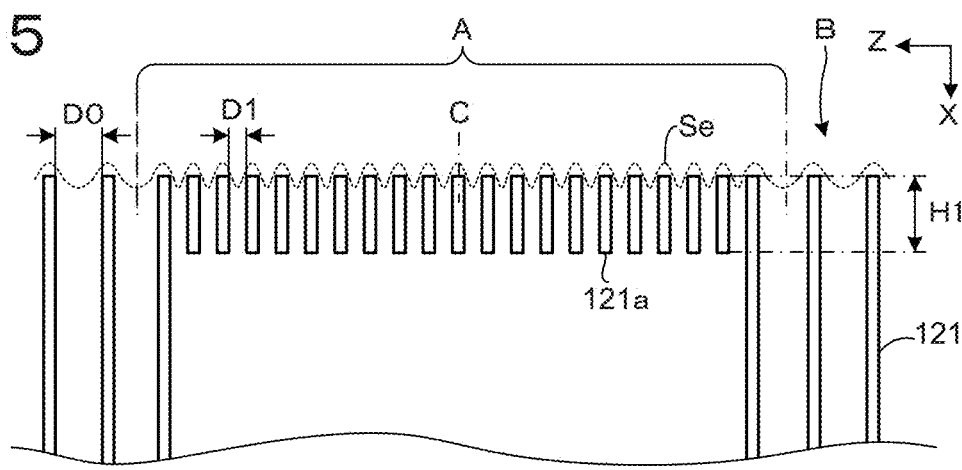

DUST COLLECTOR AND AIR CONDITIONER

CROSS-REFERENCE TO RELATED APPLICATION

This application is based upon and claims the benefit of priority from Japanese Patent Application No. 2016-183461, filed on Sep. 20, 2016; the entire contents of which are incorporated herein by reference.

FIELD

Embodiments described herein relate generally to a dust collector and an air conditioner trapping dust by electrostatic force.

BACKGROUND

To capture dust in air for cleaning, an air cleaner is used. In recent years, an air conditioner has an air cleaning function is some cases. There are air cleaners of a filter type and of an electrical dust collection type which are appropriately selected or used in combination according to the property of target particles or the size of an apparatus. The electrical dust collection type is smaller in fluid resistance than that of the filter type and can collect particles having a small particle size having relatively high efficiency.

An electrical dust collector includes a charging part and a dust collecting part which are arranged on the upstream side and the downstream side of the flow of air (gas flow) respectively. The charging part has an ionizing wire (or a needle electrode) and a counter electrode to generates plasma. Charged particles in the plasma give electrical charges to the dust in the gas flow. The dust collecting part has a dust collecting electrode and a counter electrode, and traps the charged dust by the dust collecting electrode.

Since particulates (fine particles) in the atmosphere may affect human health, there is increasing interest in particulates having a small particle size in recent years. For example, there is concern about influence on health of fine particulates having a particle size of about 2.5 μm or less (PM2.5) and of finer particulates such as ultra-fine particles having a particle size of about 0.1 μm or less (PM0.1). Accordingly, an electrical dust collector capable of removing the finer particulates is demanded. To improve the collection efficiency of fine particles having a small particle size, increasing the number and density of dust collecting electrodes is effective but is likely to lead to lamer pressure loss as making the mesh of a filter finer. It is required to improve the collection efficiency of fine particles while suppressing as much as possible the increase in pressure loss.

BRIEF DESCRIPTION OF THE DRAWINGS

FIG. 2 is a perspective view illustrating the positional relation between tips E of projecting plates 112 of a discharge electrode 11 and a counter electrode 12.

FIG. 3 is a view illustrating an example of the intervals between ends 122 of conductor plates 121 inside and outside a region A.

FIG. 4 is a view illustrating an example of the intervals between the ends 122 of the conductor plates 121 inside and outside the region A.

FIG. 5 is a view illustrating an example of the intervals between the ends 122 of the conductor plates 121 inside and outside the region A.

DETAILED DESCRIPTION

A dust collector in an embodiment includes: a discharge electrode having tips; a counter electrode including a plurality of conductor plates each having an end opposed to the discharge electrode and arrange side by side in a plate thickness direction; and a power supply that applies voltage between the discharge electrode and the counter electrode. The counter electrode has a first region closer to the tips and a second region farther from the tips than the first region, and at least one of an interval, a distance from the tips and a shape of at least part of ends in the first region is different from an interval, a distance, or a shape in the second region.

Figure 1:
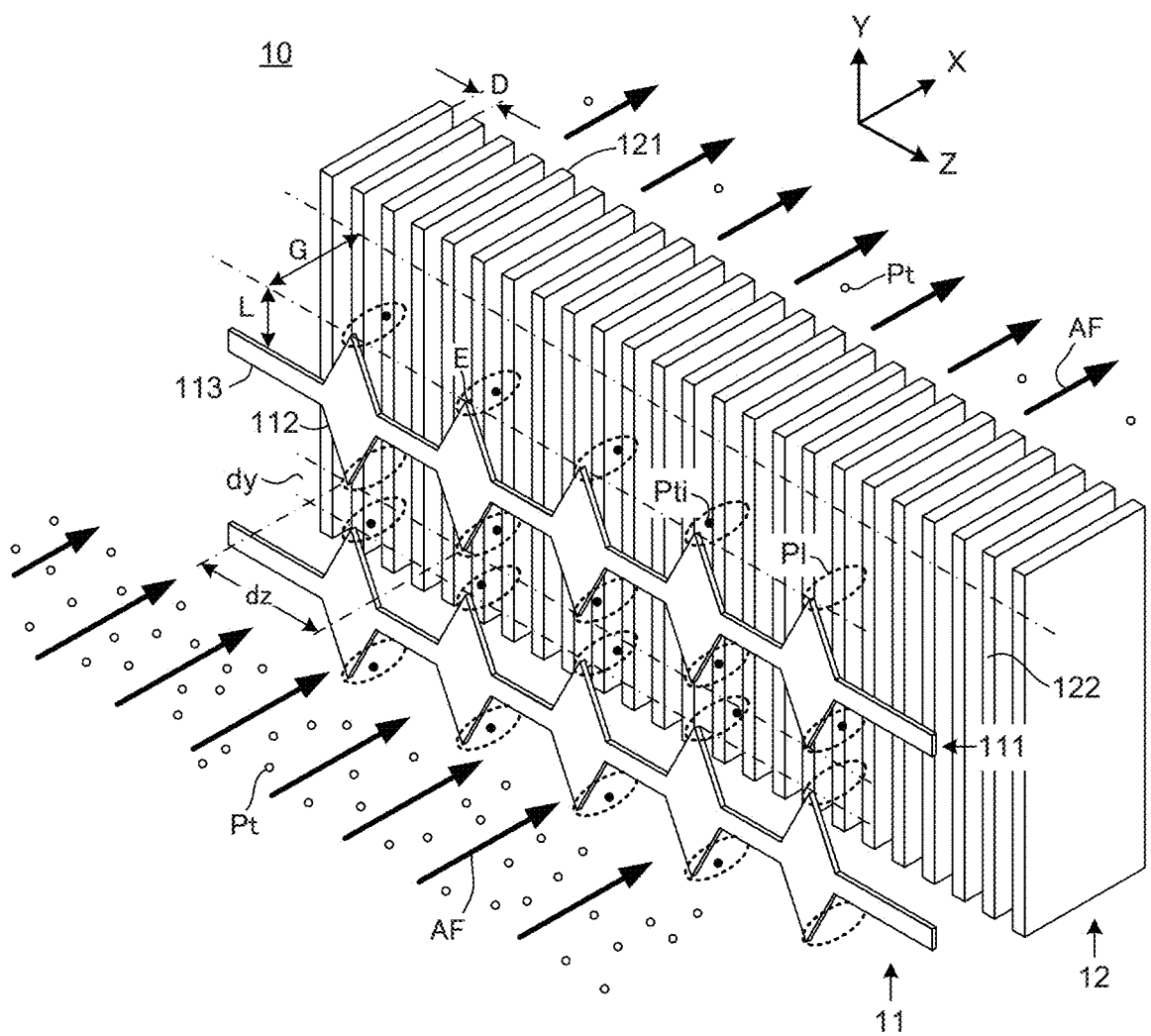
FIG. 1 is a perspective view illustrating a configuration of an electrical dust collector 10 according to a first embodiment.

Hereinafter, embodiments will be described in detail referring to the drawings. FIG. 1 is a perspective view illustrating a configuration of an electrical dust collector 10 according to an embodiment.

The electrical dust collector 10 includes a discharge electrode 11, a counter electrode 12, and a DC power supply 13 (not illustrated), and is disposed in a gas flow AF. A direction in which the discharge electrode 11 and the counter electrode 12 are arranged is an X-axis direction, and X-, Y- and Z-axes are perpendicular to one another. This applies to the other drawings.

The gas flow AF is a flow of gas (specifically, air) and flows in the X-axis direction. The gas flow AF may be any of a forced flow generated by a blowing unit such as a fan, a natural wind, a non-forced flow generated by temperature difference or the like. Accordingly, the X-axis direction and the direction of the gas flow AF do not always have to closely coincide with each other. When the gas flow AF is the forced flow, the electrical dust collector 10 is disposed in a ventilation passage installed corresponding to the blowing unit. Note that the ventilation passage only needs to allow the gas flow AF to pass therethrough and may be either in an open state or in a closed state.

The discharge electrode 11 and the counter electrode 12 are installed on the upstream side and the downstream side of the gas flow AF, respectively. The discharge electrode 11 is an electrode for plasma generation, and has a plurality of electrode plates (needle electrode plates) 111.

The plurality of electrode plates 111 are composed of flat conductor plates and arranged on a plane parallel to a YZ plane. The electrode plate 111 has a plurality of projecting plates (needle electrodes) 112 and a connector 113. Tips E of the projecting plates 112 are arranged on a plane parallel to the YZ plane. Here, the projecting plates 112 and the connector 113 on the same electrode plate 111 are arranged on the substantially the same plane. However, the projecting plates 112 and the connector 113 do not have to be arranged on the same plane.

The projecting plate 112 is a plate-shape body in a substantially isosceles triangle shape, and has a shape of being line-symmetric about an axis parallel to the Y-axis. However, the shape of the projecting plate 112 does not have to have the line-symmetric property as will be described later.

The connector 113 is a conductor plate in a substantially rectangular shape, and mechanically and electrically connects and fixes the projecting plates 112 with each other.

The counter electrode 12 has a fin shape, and functions both as the counter electrode and a dust collecting electrode. The counter electrode 12 has a plurality of conductor plates 121 basically opposed to each other at an interval D and arranged in a Z-direction (in the plate thickness direction of the conductor plates 121). However, the interval D may differ depending on a region as will be described later.

The conductor plate 121 has an end (end face) 122 opposed to the discharge electrode 11. The ends 122 of the plurality of conductor plates 121 are basically arranged on a plane parallel to the YZ plane. This plane is disposed substantially parallel to the plane where the tips E of the projecting plates 112 are arranged while forming a distance G (a distance between the discharge electrode 11 and counter electrode 12) between the planes. However, the height of the end (end face) 122 differs depending on a region as will be described later. The gap between the conductor plates 121 is a flow passage FP where the gas flow AF flows.

Note that the counter electrode 12 (conductor plates 121) is preferably covered with a hydrophilic material (for example, a hydrophilic resin). This facilitates cleaning of the counter electrode 12 and recovery of collected dust (improvement in maintenance of the electrical dust collector 10).

The DC power supply 13 applies a high DC voltage (an applied voltage Va) between the discharge electrode 11 and the counter electrode 12. The DC power supply 13 applies a negative (or positive) voltage Va of several kilovolts (for example, about 6 kV to 15 kV) to the discharge electrode 11, and the counter electrode 12 is at the earth potential.

When the voltage Va is applied to the discharge electrode 11, an electric field concentrates at the tip E of the projecting plate 112. When the voltage Va is made sufficiently large (when the intensity of the electric field near the tip E of the projecting plate 112 reaches a dielectric breakdown electric field), dielectric breakdown occurs at the tip E of the projecting plate 112, and discharge starts. More specifically, neutral molecules of gas (for example, nitrogen or oxygen in the air) in the gas flow AF are electrically charged and become ions (charged particles) (ionization). As a result, plasma P1 is generated in a region between the discharge electrode 11 and the counter electrode 12 (exactly, a region surrounding the tip E of the projecting plate 112 and facing the counter electrode 12).

When the gas flow AF passes through the plasma P1 and near there, the electrical charges of the charged particles (positive and negative ions and electrons, mainly negative ions) in the plasma P1 adhere to (charge) dust Pt in the gas flow AF, which becomes charged dust Pti. The charged dust Pti receives electrostatic force from the electric field between the discharge electrode 11 and the counter electrode 12, and is attracted to and captured by the counter electrode 12 at the earth potential.

Though not illustrated, the discharge electrode 11 and the counter electrode 12 (in particular, the discharge electrode 11) may be surrounded by a frame made of an insulating material (for example, an Acrylonitrile butadiene styrene (ABS) resin). This can prevent human body from coming into contact with the discharge electrode 11 and getting a shock. This frame is useful also in securing the strength of the electrical dust collector 10.

The distance G between the discharge electrode 11 and counter electrode 12 is about 5 mm to 30 mm, and more preferably 10 mm to 20 mm when the applied voltage Va is about several kilovolts. To suppress abnormal discharge, a certain distance G is required. With an increase in the applied voltage Va, the distance G needs to be increased.

The plate thickness of the electrode plate 111 is preferably 0.1 mm to 2 mm, and more preferably 0.2 mm to 0.5 mm (for example, about 0.3 mm). When the plate thickness is smaller than 0.1 mm, the discharge electrode 111 decreases in strength and may bend while in use of the electrical dust collector 10. On the other hand, when the plate thickness is larger than 2 mm, the processing (production) of the electrode plate 111 and discharge from the electrode plate 111 may become difficult.

An interval dz in the Z-axis direction (left-right direction) between the projecting plates 112 is preferably 5 mm to 20 mm, and more preferably 10 mm to 15 mm (for example, about 13 mm).

A length L of the projecting plate 112 is preferably 3 mm to 15 mm, and more preferably 5 mm to 15 mm (for example, about 10 mm).

An interval D between the conductor plates 121 is preferably 0.1 mm to 5 mm, and more preferably 0.5 mm to 2 mm (for example, about 1 mm). As will be described later, the interval D may differ in this range.

A ratio R of the interval D between the conductor plates 121 to the interval dz between the projecting plates 112 (=dz/D) is preferably 5 to 20, and more preferably 10 to 15 (for example, about 10).

In other words, the interval D between the conductor plates 121 is preferably small enough as compared to the interval dz between the projecting plates 112. Setting the interval D between the conductor plates 121 to be small as compare to the interval dz makes the discharge state closer to that in the case where the whole counter electrode 12 is in a planar shape. In other words, the variation in plasma intensity in each projecting plate 112 is suppressed to decrease the need to align each projecting plate 112 with the conductor plates 121.

FIG. 2 indicates the positional relation between the tips E of the projecting plates (needle electrodes) 112 of the discharge electrode 11 and the ends 122 of the counter electrode 12.

As has been described, the ends 122 are basically arranged on a plane F parallel to the YZ plane. The plane F has regions A corresponding to the tips E of the projecting plates 112. In other words, the plane F is divided into first regions (the regions A) closer to the tips E and a second region (a region other than the regions A (a region B)) farther from the tips E than are the regions A.

More specifically, the region A is a predetermined region (for example, a circular shape, a polygonal shape) around a later-described point C corresponding to the tip E and includes at least a region closest to the tip E. A line segment linking the center C of the region A and the tip E is substantially perpendicular to the plane F formed by the ends (end faces) 122 of the plurality of conductor plates 121 constituting the counter electrode 12. This is because the gas flow AF and the counter electrode 12 are face to each other in this configuration. More generally, the intersection of a line segment of extension from the tip E in the gas flow AF direction and the plane F becomes C, and a region around the point C can be considered as the region A. In this region A, the interval between or the height (the distance from the tip E of the discharge electrode 11) of the ends 122 of at least part of the conductor plates 121 is different from that outside the region A (in the region B). The boundary between the regions A and B is rectangular here, but this shape can be various shapes such as a circular shape, an elliptical shape, a triangular shape, a polygonal shape of a pentagon or more.

To collect ultra-fine particles, it is important to devise the configuration in the region A, which will be described below with concrete examples. Generally, in the electrical dust collector, how much dust can be charged, and how much charged dust can be collected are important. Accordingly, to increase the dust collection efficiency, it is necessary to increase the quantity of electric charges or/and the collection efficiency of dust. To increase the quantity of electric charges, it can be considered to increase the absolute value of the applied voltage. In this method, the plasma density is increased to increase the collision frequency between the flowing-in dust and the charged particles in plasma, thereby increasing the amount of electrical charge adhering to the dust. On the other hand, to increase the collection efficiency, it is considered to increase the number and the density of dust collecting electrodes. This offers the same effect as that of fining the mesh of the filter in a filter-type air cleaning technique.

Also in the case where the particle size being a target is small, there is a need to increase the density of the dust collecting electrodes or to make the mesh of the filter finer. This, however, leads to an increase in resistance to the gas flow AF, resulting in an increase in the dust collection efficiency but causing an increase in pressure loss at the same time. In particular, this tendency becomes strong for the fine particles having small particle sizes called PM2.5 and PM0.1. As described above, it is difficult to achieve both the improvement in dust collection performance and the decrease in pressure loss.

In this embodiment, the interval between or the height or shape of the ends 122 of the conductor plates 121 is made different between inside and outside the region A to achieve both the improvement in dust collection performance and the decrease in pressure loss.

FIG. 3 to FIG. 8 illustrate examples of the interval between or the height or shape of the ends 122 of the conductor plates 121 inside and outside the region A.

(1) Change in the Interval Between the Ends 122

The case where the interval between the ends 122 of the conductor plates 121 is different between inside and outside the region A will be described. In FIG. 3, an interval D1 between the ends 122 of the conductor plates 121 in the region A is smaller than an interval D0 in the region B. In FIG. 4, FIG. 5, the interval D1 is smaller only near the ends 122 of the conductor plates 121 in the region A, than an interval D0 outside the region A. In FIG. 4, conductor plates 121a, which are smaller in height than the conductor plates 121, are arranged between the conductor plates 121. In FIG. 5, conductor plates 121a smaller in height are arranged at narrow intervals in the region A.

Making the interval between the ends 122 of at least part of the conductor plates 121 in the region A different from that in the region B as described above, enables efficient collection of ultra-fine particles (for example, PM0.1).

The ultra-fine particles (for example, PM0.1) are different in behavior, when collected by the counter electrode 12, from that of the fine particulates (for example, PM2.5) and are greatly affected by an electric field (an electric field in the transverse direction (the Z-axis direction)) near the ends 122 of the conductor plates 121. Hereinafter, its details will be described.

Figure 9:
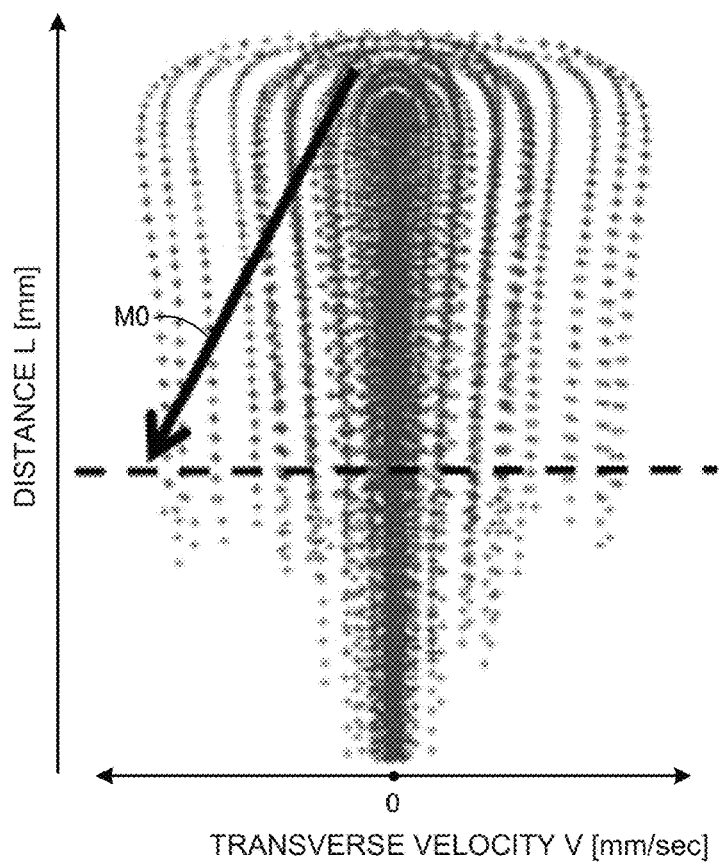
FIG. 9 is a view illustrating the relation between a distance L between particles and the counter electrode 12, and, a velocity V in a transverse direction.
Figure 10:
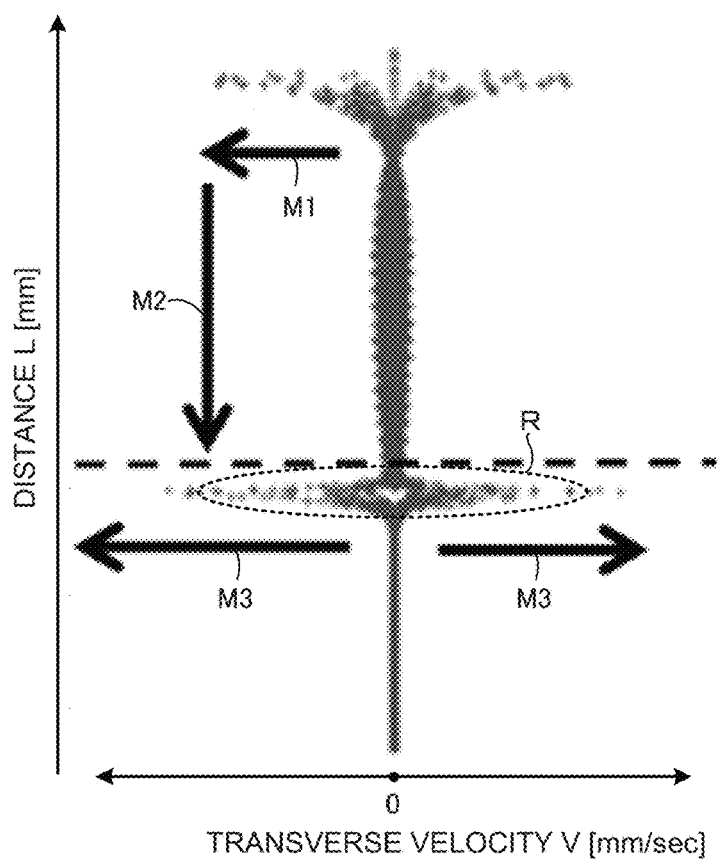
FIG. 10 is a view illustrating the relation between the distance L between particles and the counter electrode 12, and, the velocity V in the transverse direction.

FIG. 9, FIG. 10 each illustrates the relation between a distance L between the particles when the particles having diameters of 2.5 μm and 0.1 μm are charged by the discharge electrode 11 and collected by the counter electrode 12 and the ends 122, and, a velocity V in a transverse direction (a direction parallel to the ends 122, namely, the Z-axis direction) of the particles. This is a result of numerical simulation. In this simulation, the movement of the dust in the electrical dust collector is simulated by tracing the loci of the fine particles assumed to have been charged by the charged particles in plasma.

As illustrated in FIG. 9, in the case of the particle size of 2.5 μm, the transverse velocity V rarely changes irrespective of the distance L between the particles and the ends 122. More specifically, when the particle size is 2.5 μm, the particles go ahead from the tip E in an oblique direction toward the counter electrode 12 as indicated with an arrow M0 (substantially uniform motion in the transverse direction), enter between the conductor plates 121, and finally collide with and are collected by the side surfaces of the conductor plates 121.

In contrast to this, as illustrated in FIG. 10, in the case of the particle size of 0.1 μm, the particles, at an initial stage of being charged, have a velocity component in the transverse direction (an arrow M1), but rapidly lose the velocity component in the transverse direction, and go straight ahead toward the counter electrode 12 (an arrow M2). This is because the particle size (mass) is small and is thus likely to be braked by air resistance. Thereafter, the particles get the velocity V in the transverse direction, near the ends 122 of the conductor plates 121 (an arrow M3), collide with and are collected by the side surfaces of the conductor plates 121 (getting the velocity V in the transverse direction is illustrated in a frame R). Since the particle size (mass) is small, the particles are strongly affected by a relatively weak electric field (an electric field in the transverse direction being the Z-axis direction) near the ends 122 of the conductor plates 121.

As described above, the fine particulates (for example, PM2.5) are accelerated in the transverse direction by a relatively strong electric field at the tips E of the discharge electrode 11 and tend to be collected by the whole side surfaces of the conductor plates 121. In contrast, the ultra-fine particles (for example, PM0.1) are accelerated by a relatively weak electric field near the ends 122 of the conductor plates 121 and collected by the side surfaces of the conductor plates 121 near the ends 122. Therefore, (1) increasing the electric field near the ends 122 of the conductor plates 121 (namely, the region A) and (2) accelerating the collection near the ends 122 of the conductor plates 121 (namely, the region A) contribute to efficient collection of the ultra-fine particles (for example, PM0.1).

As in FIG. 3 to FIG. 5, making the interval between the conductor plates 121 (the ends 122) smaller in the region A corresponding to the tip E of the discharge electrode 11 enables efficient collection of the ultra-fine particles. As has been described, the ultra-fine particles tend to be incident substantially perpendicularly on the region A from the surroundings of the tip E and be collected by the side surfaces near the ends 122 of the conductor plates 121. Therefore, making the interval between the conductor plates 121 smaller to decrease the distance between the ultra-fine particles passing between the conductor plates 121, and, the side surfaces of the conductor plates 121, thereby enabling acceleration of the collection of the ultra-fine particles.

Making the interval between the conductor plates 121 smaller also leads to increasing the electric field in the transverse direction near the ends 122 of the conductor plates 121. This is understandable also by comparing equipotential surfaces Se in FIG. 3 and FIG. 5 between the regions A and B. More specifically, the inclination of the equipotential surface Se between the conductor plates 121 in the region A is larger than the inclination of the equipotential surface Se between the conductor plates 121 in the region B, and the electric field in the transverse direction (the Z-axis direction) between the conductor plates 121 in the region A, in particular, near the ends 122 is larger than that in the region B. This electric field in the transverse direction also contributes to efficient collection of the ultra-fine particles.

It can be considered to decrease the interval D between (increase the density of) the conductor plates 121 in the whole counter electrode 12 without limiting the region. This can also improve the collection efficiency of the ultra-fine particles. However, decreasing the interval D between the conductor plates 121 at a place (the region B) largely deviated from the region A does not result in improvement in the collection efficiency of the ultra-fine particles because the charged ultra-fine particles do not reach the deviated region. In this case, the pressure loss of fluid passing through the counter electrode 12 becomes large. In other words, the flow rate of the fluid passing through the counter electrode 12 decreases to decrease the processing capability of the electrical dust collector 10.

Setting a range, where the interval between the conductor plates 121 is decreased, to the region A corresponding to the tip E of the discharge electrode 11 as described above is effective to suppress the increase in pressure loss so as to increase the processing capability of the electrical dust collector 10.

Further, making the interval between the conductor plates 121 smaller only near the ends 122 of the conductor plates 121 in the region A as in FIG. 4, FIG. 5 is more effective to suppress the increase in pressure loss so as to increase the processing capability of the electrical dust collector 10.

Further, as in FIG. 5, the conductor plates 121a with a shorter length may be arranged only near the ends 122 of the conductor plates 121 in the region A. This can further increase the processing capability of the electrical dust collector 10.

In this case, the ultra-fine particles are to be collected mainly in the region A, and the fine particulates are to be collected in the region B. In short, the collection targets are shared between portions of the counter electrode 12. As a result, the collection efficiency of the fine particulates (for example, PM2.5) in the region A decreases. However, if giving priority to the collection of the ultra-fine particles, some decrease in collecting the fine particulates is acceptable.

(2) Change in the Height of the End 122

Figure 6:
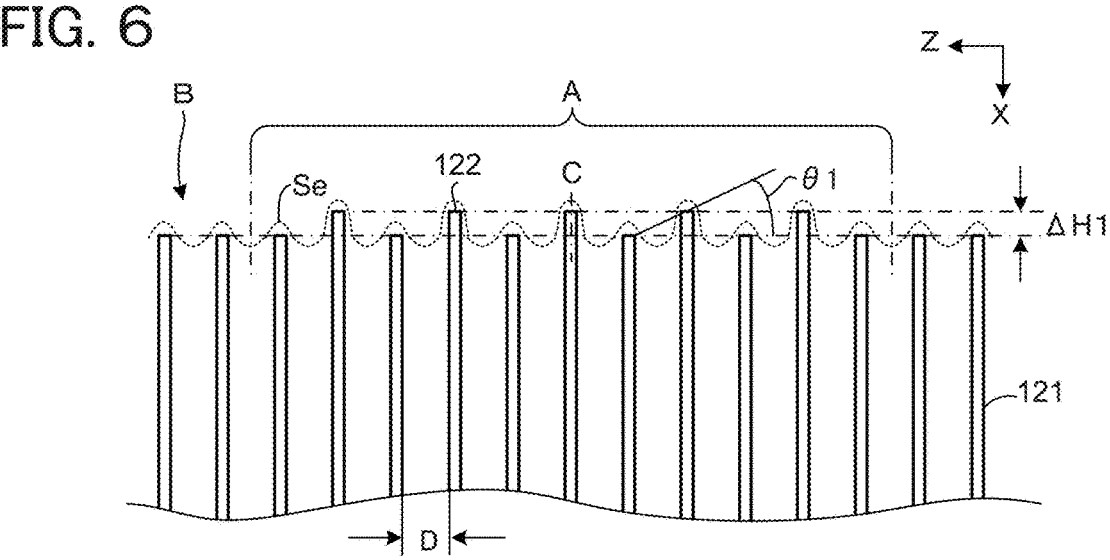
FIG. 6 is a view illustrating an example of the heights of the ends 122 of the conductor plates 121 inside and outside the region A.
Figure 7:
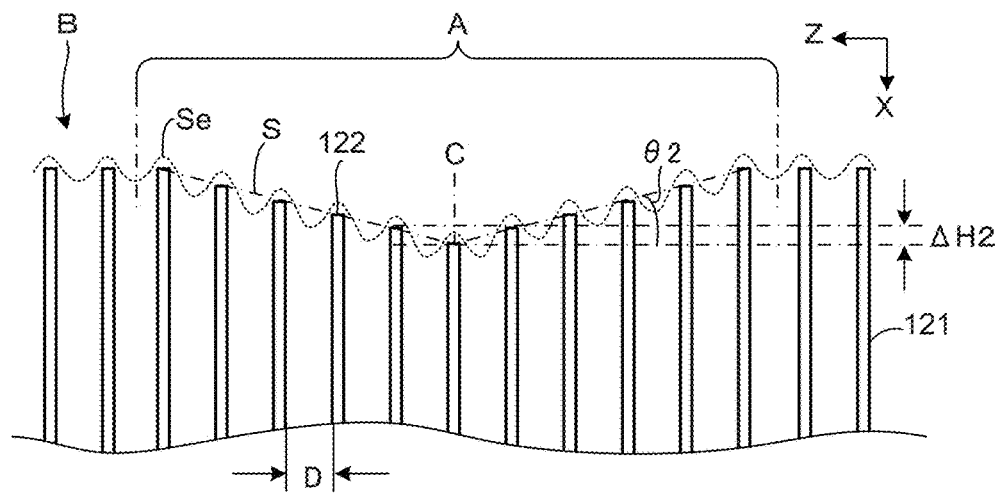
FIG. 7 is a view illustrating an example of the heights of the ends 122 of the conductor plates 121 inside and outside the region A.

The case where the height of the end 122 of the conductor plate 121 is different between inside and outside the region A will be described. In FIG. 6, the heights of the ends 122 of the conductor plates 121 are alternately changed in the region A. In FIG. 7, the heights of the ends 122 of the conductor plates 121 increase sequentially from the center C in the region A. Conversely, the heights of the ends 122 of the conductor plates 121 may decrease sequentially from the center C (different from FIG. 7 in plus and minus of the change in height). This reason will be described later.

Making the heights of the ends 122 of the adjacent conductor plates 121 different in the region A as in FIG. 6, FIG. 7, increases the transverse electric field at the ends 122 of the conductor plates 121 to improve the collection efficiency of the ultra-fine particles (for example, PM0.1).

If the direction of the electric field is only in the X-axis direction, force only in the X-axis direction is applied to the charged dust Pti to facilitate the charged dust Pti to pass between the conductor plates 121 (the flow passage FP). In other words, it is important, in improving the collection efficiency of the charged dust Pti, that the electric field has a Z-axis component (a transverse electric field).

FIG. 11 to FIG. 14 illustrate distributions of potentials and transverse electric fields when a voltage is applied between the discharge electrode 11 (the projecting plates 112) and the counter electrode 12 (the conductor plates 121). In the region A, the heights of the adjacent conductor plates 121 are made different. A voltage of −6000 V is applied to the projecting plates 112, and the voltage of the conductor plates 121 is 0V.

Figure 11:
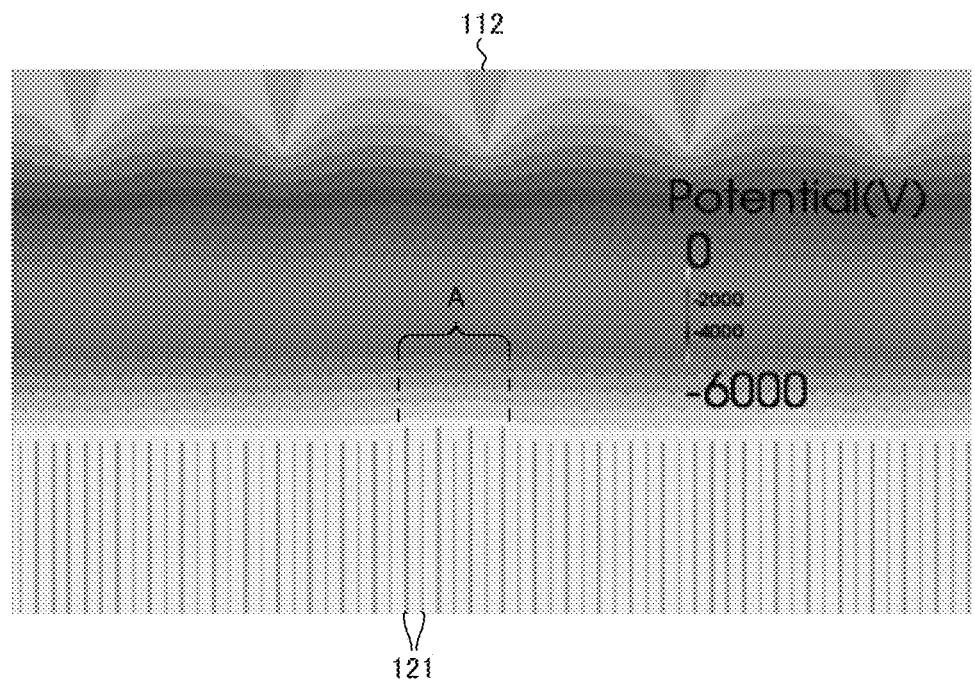
FIG. 11 is a view illustrating the whole potential distribution including the discharge electrode 11 and the counter electrode 12.
Figure 12:
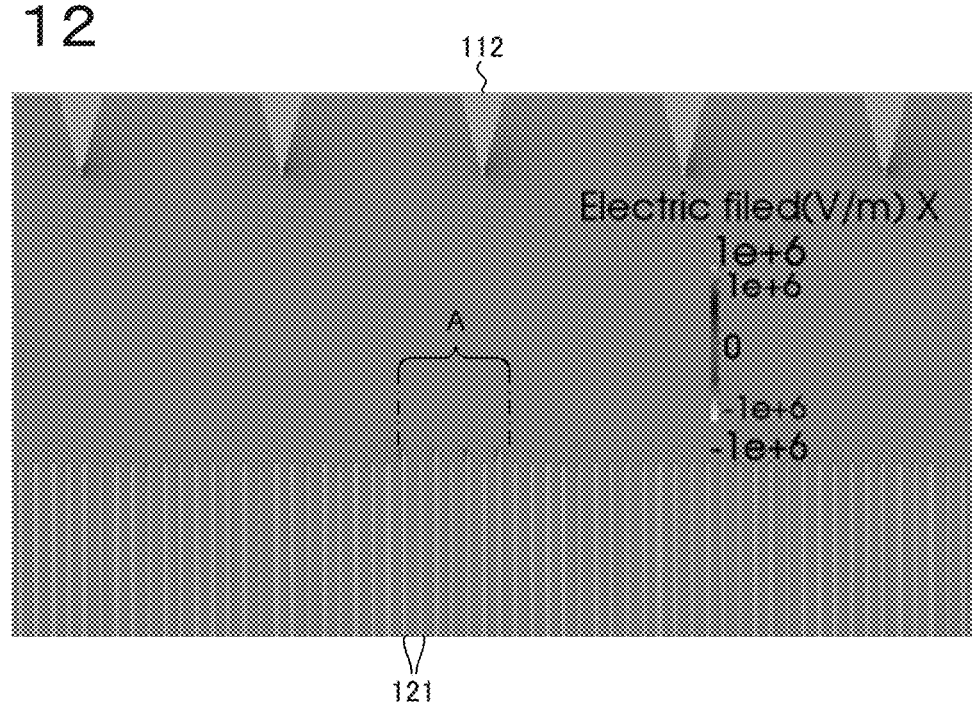
FIG. 12 is a view illustrating the potential distribution near the ends of the conductor plates 121.
Figure 13:
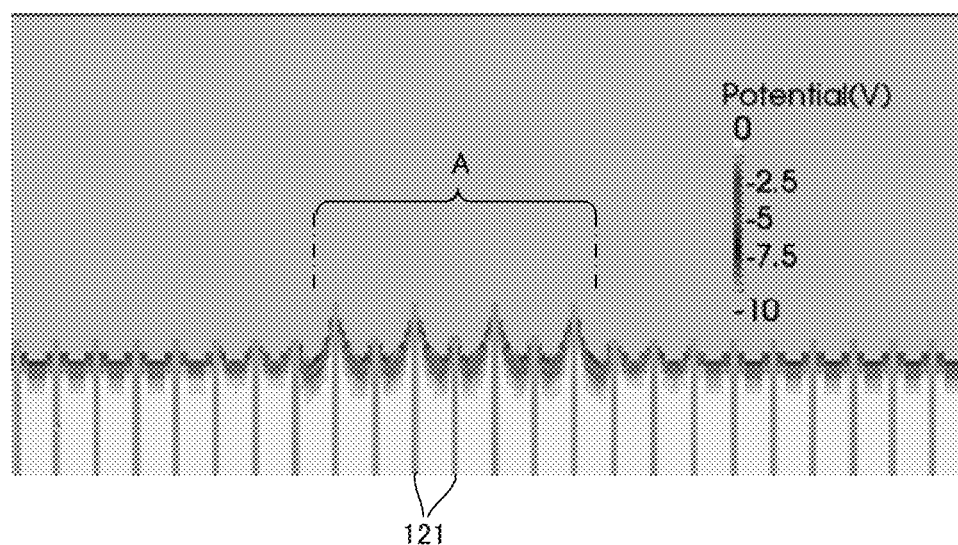
FIG. 13 is a view illustrating the whole transverse electric field distribution including the discharge electrode 11 and the counter electrode 12.
Figure 14:
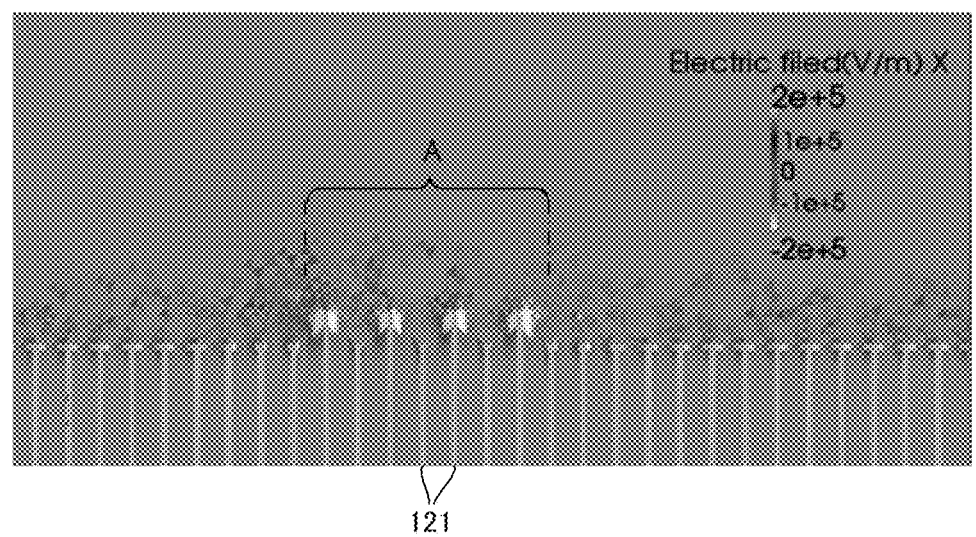
FIG. 14 is a view illustrating the transverse electric field distribution near the ends of the conductor plates 121.

FIG. 11, FIG. 12 illustrate the whole potential distribution and transverse electric field distribution including the discharge electrode 11 and the counter electrode 12, respectively. FIG. 13, FIG. 14 illustrate the potential distribution and transverse electric field distribution near the ends 122 of the conductor plates 121, respectively.

It was confirmed that near the ends 122 of the conductor plates 121 in the region A, the change in the potential distribution was large and the transverse electric field intensity was about twice that in the other region. This electric field intensity is quite smaller (about 1/10) than the electric field near the tip E of the discharge electrode 11. However, taking into consideration that the transverse electric field near the ends 122 of the conductor plates 121 is effective to collection of the ultra-fine particles even outside the region A as illustrated in FIG. 10, the transverse electric field intensity becoming about twice leads to great improvement in the collection efficiency of the ultra-fine particles (for example, PM0.1).

Making the heights of the ends 122 of the conductor plates 121 different sequentially from the center C as illustrated in FIG. 7 increases the transverse electric field. At this time, even if the change in height is different in plus and minus (the heights of the ends 122 decrease sequentially from the center C), a transverse electric field occurs between adjacent ends 122. The equipotential surface Se near the ends 122 here is inclined, on average, along a surface S formed by the ends 122. In FIG. 7 (in the case where the heights of the ends 122 increase sequentially from the center C, namely, the surface S is a concave shape), the charged ultra-fine particles (for example, PM0.1) tend to be incident substantially perpendicularly on the average equipotential surface, and the charged ultra-fine particles can be attracted from a wider range as compared with the case where the average equipotential surface is a flat surface shape.

In the case where the surface S is in the concave shape as in FIG. 7, the collection efficiency of the fine particulates having a particle size larger than that of the ultra-fine particles is rather improved. As has been described, the fine particulates go ahead in an oblique direction toward the counter electrode 12 and are thus more likely to be affected by the average equipotential surface than are the ultra-fine particles. In other words, it is more preferable to change the heights in the direction in FIG. 7 for collection of the fine particulates.

Though depending on the flow velocity of the gas flow AF, the applied voltage (electric field) and so on, the following setting is preferable taking into consideration both of the pressure loss of the fluid and the collection efficiency of the ultra-fine particles. The width of the region A is preferably 2 mm to 10 mm, and more preferably 3 mm to 7 mm (for example, about 5 mm). This is because, in the discharge of an applied voltage of about several kilovolts used for general electrical dust collection, the plasma region (a region giving electrical charges to the dust Pt) is about several millimeters and the ultra-fine particles move from this region in the Z-direction only by several millimeters at most. The width of the region A is defined as an interval between the boundaries between the regions A and B in the Y-direction and/or the Z-direction. For example, when the planar shape of the region A is a square, the width of the region A corresponds to the length of the side of the square. Besides, when the planar shape of the region A is a circle, the width of the region A corresponds to the diameter of the circle.

A level difference $\Delta H1$ in FIG. 6 is preferably 0.1 mm to 5 mm, and more preferably 1 mm to 3 mm (for example, about 2 mm). When the level difference $\Delta H1$ is too large, the distance between the discharge electrode 11 and the counter electrode 12 becomes non-uniform, possibly causing non-uniform discharge (discharge becomes unstable).

The center in FIG. 7 is preferably concave rather than convex. This is because the counter electrode 12 can be made to face the fine particles radially scattering from the tip E as has been described. A level difference $\Delta H2$ at this time is preferably 0.1 mm to 5 mm, and more preferably 1 mm to 2 mm (for example, about 1 mm). Here, a total sum (total level difference) $\Delta Ht$ of the level difference $\Delta H2$ (the difference between the height of the conductor plate 121 at the center C and the height of the conductor plate 121 in the region B) is preferably limited into a certain range. When the total level difference $\Delta Ht$ is too large, the distance between the discharge electrode 11 and the counter electrode 12 becomes non-uniform, possibly causing non-uniform discharge (discharge becomes unstable). Besides, when the total level difference $\Delta Ht$ is too small, the transverse electric field is small to make the efficient collection of the ultra-fine particles difficult. Concretely, the total level difference $\Delta Ht$ is preferably 1 mm to 10 mm, and more preferably 1 mm to 7 mm (for example, about 5 mm). When the level difference $\Delta H2$ and the total level difference $\Delta Ht$ are set as described above, the number of level differences in the whole is preferably 5 to 30, and more preferably 10 to 20 (for example, 10).

The interval D between the conductor plates 121 in the region B (other than the region A) is preferably 0.1 mm to 5 mm, and more preferably 0.5 mm to 2 mm (for example, about 1 mm). In contrast to this, the interval D1 between the conductor plates 121 in the region A in FIG. 3 to FIG. 5 is preferably 0.1 mm to 3 mm, and more preferably 0.5 mm to 2 mm (for example, about 1 mm). At this time, a ratio Rd between the interval D1 and the interval D0 (=D0/D1) is preferably 1.5 to 10, and more preferably 2 to 5 (for example, about 3).

Further, a height H1 of the conductor plate 121a is preferably 1 mm to 30 mm, and more preferably 5 mm to 20 mm (for example, about 10 mm).

The difference in height between the ends 122 of the conductor plates 121 (level difference) $\Delta H1$, $\Delta H2$ in FIG. 6, FIG. 7 may be in the following relation with the interval D between the conductor plates 121.

$$0.27 \leq \Delta H1/D \text{ or } \Delta H2/D \leq 3.7$$

This means that an angle $\theta$ ($\theta 1$ or $\theta 2$) formed by a line segment linking the adjacent ends 122 of the conductor plates 121 with respect to the Z-direction falls within the following range.

$$15° \leq \theta \leq 75°$$

This range substantially coincides with the conditions where the level difference $\Delta H1$, $\Delta H2$ falls within a range of several millimeters when the interval D is several millimeters. A level difference $\Delta H1$, $\Delta H2$ at an order of 0.01 mm makes the transverse electric field negligibly smaller, and a level difference $\Delta H1$, $\Delta H2$ at an order of several centimeters affects the discharge stability.

When the angle θ is too small, the level difference ΔH1, ΔH2 is small, and the transverse electric field becomes small. When the angle θ is too large, the distance between adjacent ends 122 is large, and the transverse electric field also becomes small. Thus, to obtain a large transverse electric field to a certain degree, it is preferable to set the range of the angle θ. The angle θ (ratio ΔH1/D=tan θ) is more preferably set as follows.

$$30° \leq \theta \leq 60°$$

$$1/\sqrt{3}(=0.58) \leq \Delta H1/D \text{ or } \Delta H2/D \leq \sqrt{3}(=1.73)$$

(3) Change in the Shape of the End 122

Figure 8:
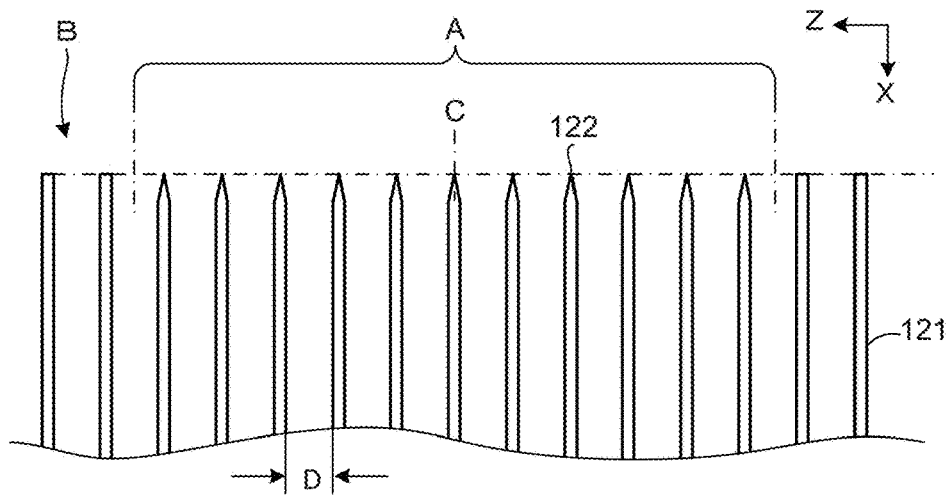
FIG. 8 is a view illustrating an example of the shapes of the ends 122 of the conductor plates 121 inside and outside the region A.

The case where the shape of the end 122 of the conductor plate 121 is different between inside and outside the region A will be described. The transverse electric field near the ends 122 in the region A can be increased also by sharpening the ends 122 of the conductor plates 121 in the region A as illustrated in FIG. 8. A relatively large transverse electric field can be obtained by the sharpened ends 122 to efficiently collet the ultra-fine particles.

Second Embodiment

Figure 15:
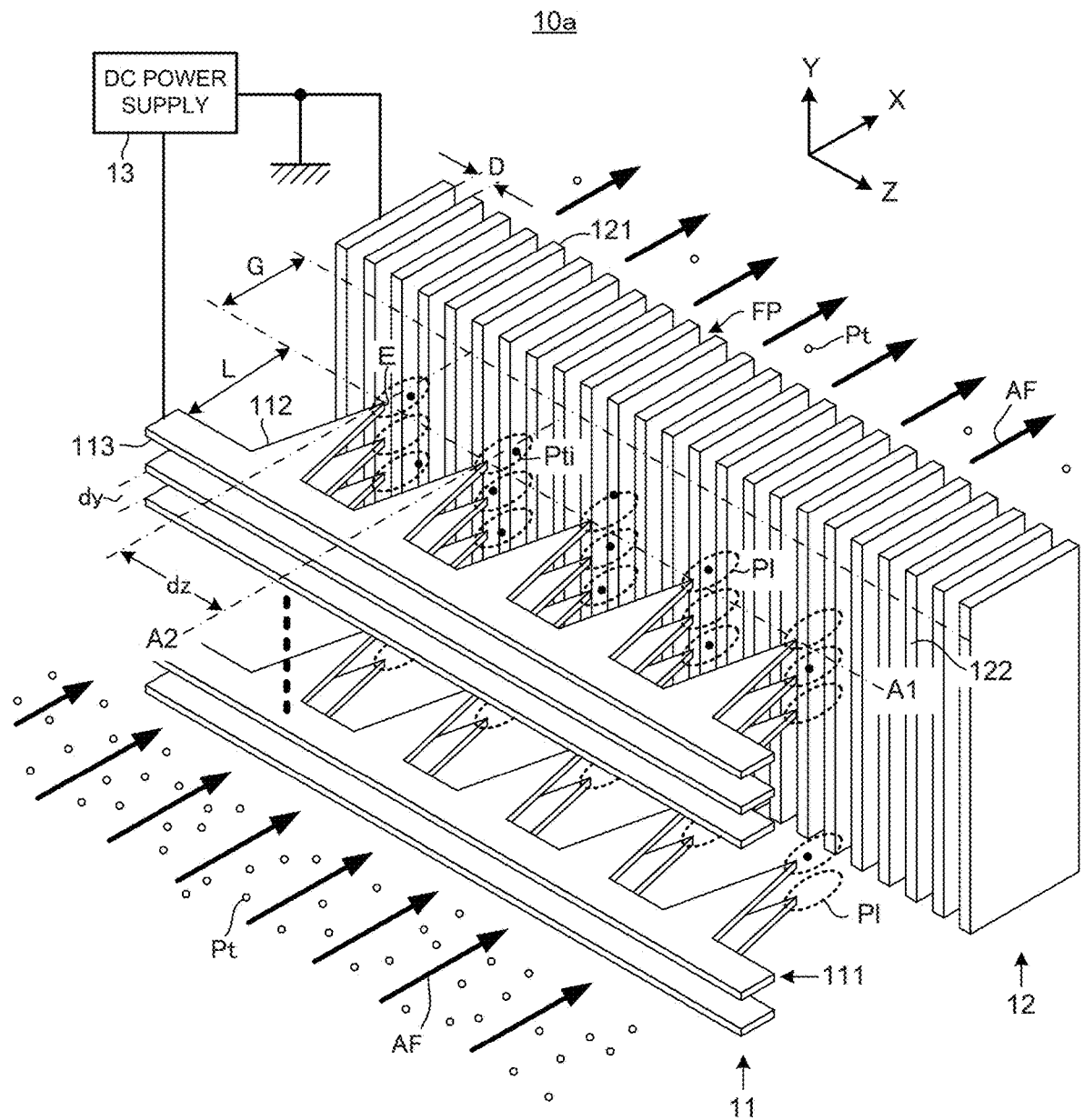
FIG. 15 is a perspective view illustrating a configuration of an electrical dust collector 10a according to a second embodiment.

FIG. 15 is a perspective view illustrating a configuration of an electrical dust collector 10a according to a second embodiment. The electrical dust collector 10a includes a discharge electrode 11, a counter electrode 12, and a DC power supply 13, and is disposed in a gas flow AF.

The discharge electrode 11 is an electrode for plasma generation, and has a plurality of electrode plates (needle electrode plates) 111 arranged side by side in the Y-direction.

The electrode plate 111 is composed of a flat conductor plate and has a plurality of projecting plates (needle electrodes) 112 and a connector 113.

Tips E of the projecting plates 112 on the same electrode plate 111 are arranged on an axis A1 parallel to the Z-axis (in a direction substantially perpendicular to the plate thickness direction of the shaped projecting parts 112) at an interval dz. Further, tips E of projecting plates 112 on different electrode plates 111 are arranged in the Y-axis direction (in the plate thickness direction of the shaped projecting parts 112) at an interval dy. In short, the tips E of the projecting plates 112 are arranged on a plane parallel to a YZ plane.

The tips E of the projecting plates 112 are opposed to the counter electrode 12 and face in the direction of the counter electrode 12 (here, an X-axis positive direction).

Also in this embodiment, making the interval between or the height or shape of the ends 122 of at least part of the conductor plates 121 in the region A corresponding to the tip E of the discharge electrode 11 different from that outside the region A (in the region B), enables efficient collection of the ultra-fine particles (for example, PM0.1).

Modification Example

Hereinafter, a modification example of the electrical dust collector 10 will be described. Here, the discharge electrode 11 may correspond to any of the first and second embodiments. In other words, the projecting plates (needle electrodes) 112 may be along any of the YZ plane and the XZ plane.

(1) Shape of the Projecting Plate 112

FIG. 16A to FIG. 16D are plane views illustrating examples of the shape of the electrode plate 111 (the discharge electrode 11).

Figure 16A:
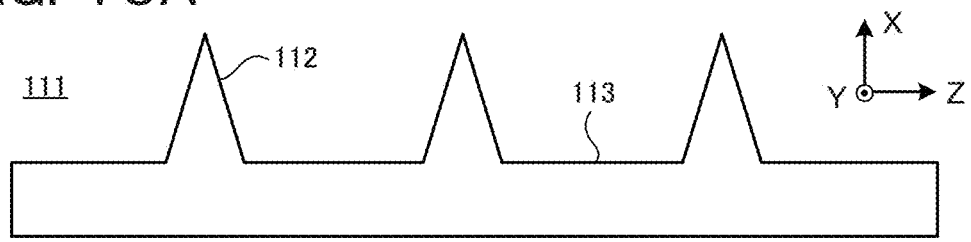
FIG. 16A is a plane view illustrating an example of the electrode plate 111.

In this embodiment, the projecting plate 112 is in a shape symmetrical bilaterally (in the Z-direction) such as an isosceles triangle (including an equilateral triangle) (refer to FIG. 16A).

Figure 16B:
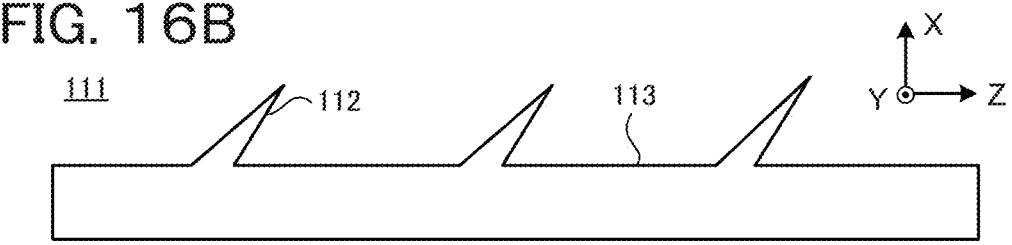
FIG. 16B is a plane view illustrating an example of the electrode plate 111.

The projecting plate 112 may be an asymmetrical triangle (refer to FIG. 16B). At this time, the projecting plate 112 is directed in an oblique direction. The direction of the projecting plate 112 may be inclined to some extent from the X-axis direction as described above.

Figure 16C:
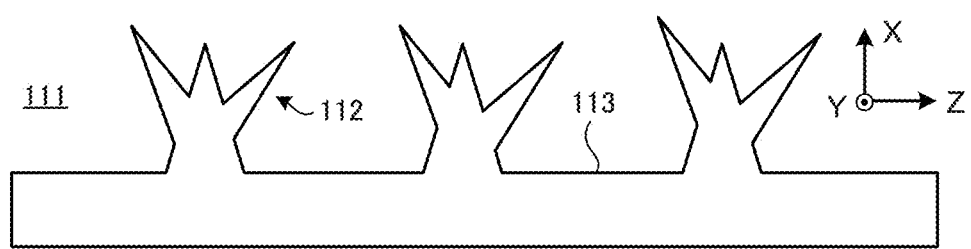
FIG. 16C is a plane view illustrating an example of the electrode plate 111.
Figure 16D:
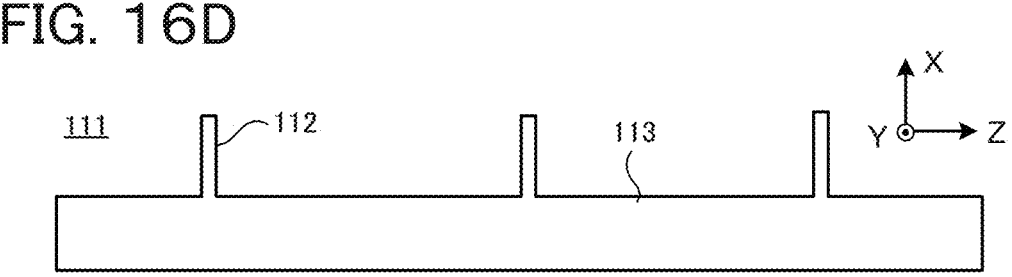
FIG. 16D is a plane view illustrating an example of the electrode plate 111.

The projecting plate 112 may have a plurality of projections (the tip E is branched into a plurality of parts) (refer to FIG. 16C). At this time, the projecting plate 112 may be asymmetrical bilaterally (in the Z-direction). The projecting plate 112 may be a line such as a wire or a thin bar shape (refer to FIG. 16D).

Figure 17:
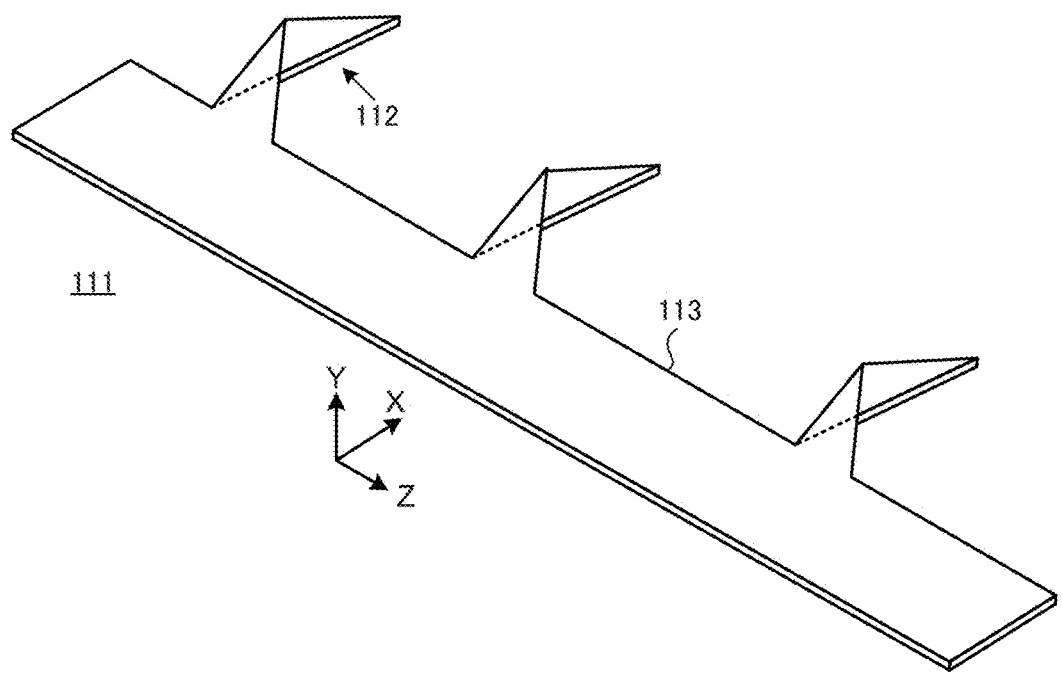
FIG. 17 is a perspective view illustrating an example of the electrode plate 111.
Figure 18A:
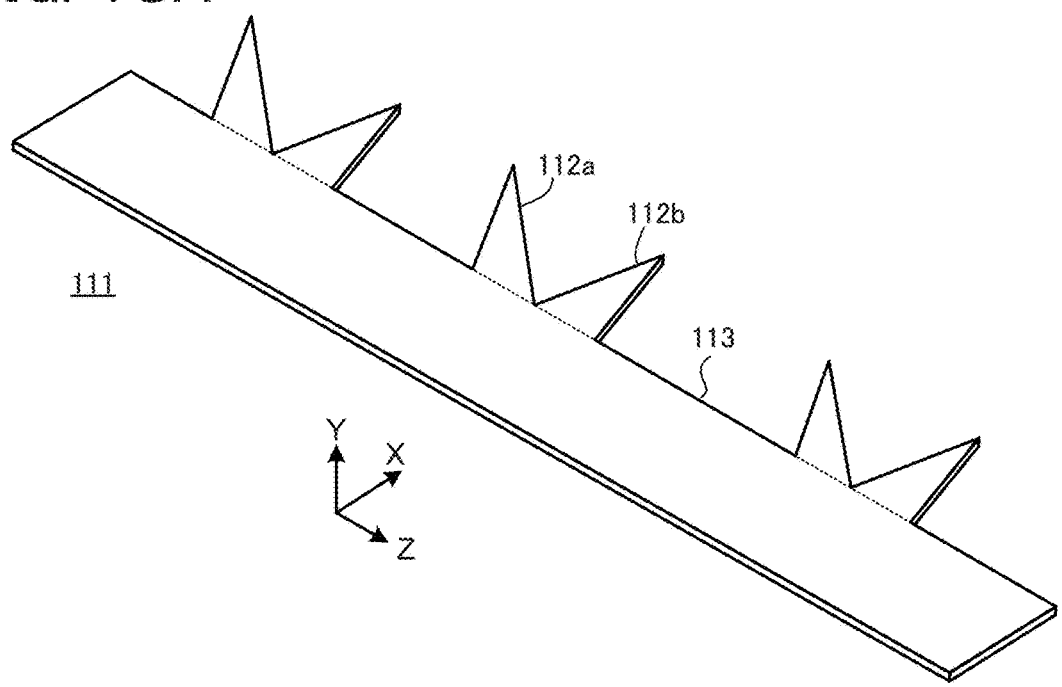
FIG. 18A is a perspective view illustrating an example of the electrode plate 111.
Figure 18B:
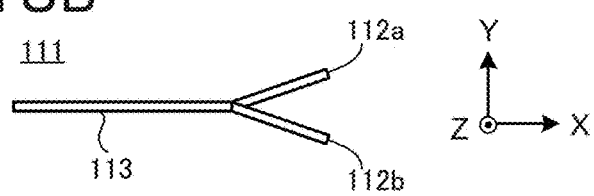
FIG. 18B is a side view illustrating the electrode plate 111 in FIG. 18A.
Figure 19:
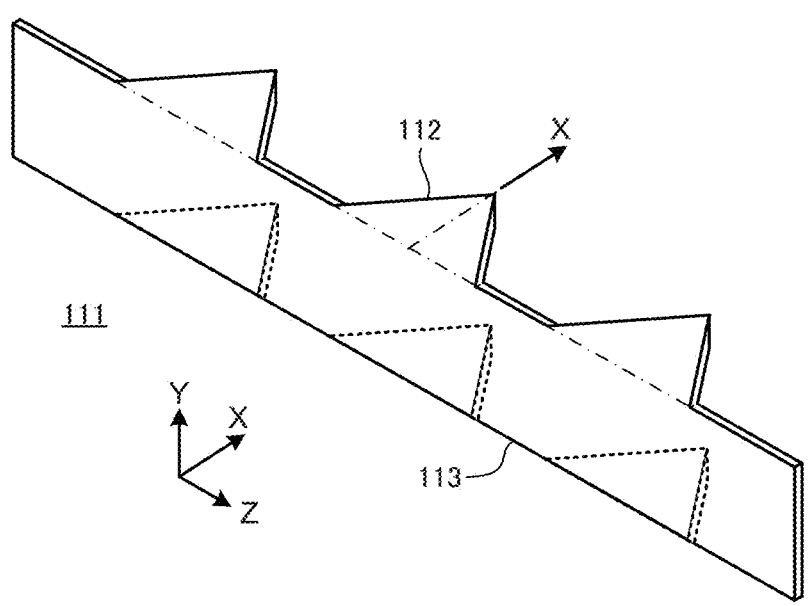
FIG. 19 is a perspective view illustrating an example of the electrode plate 111.

FIG. 17, FIG. 19 are perspective views illustrating examples of the electrode plate 111. FIG. 18A, FIG. 18B are a perspective view and a side view illustrating an example of the electrode plate 111.

The projecting plate 112 may be bent (refer to FIG. 17). Projecting plates 112a, 112b in different shapes may be connected to the connector 113 (refer to FIG. 18A, FIG. 18B). Here, the directions of the projecting plates 112a, 112b are changed in a positive direction and a negative direction of the Y-axis. At this time, the projecting plates 112a, 112b are not arranged on the same plane with the connector 113 so that the whole electrode plate 111 has a three-dimensional shape.

The connector 113 may be disposed on the YZ plane and the projecting plate 112 may be bent (refer to FIG. 19). Here, the projecting plate 112 is bent and is thereby directed in the X-axis direction (the counter electrode 12). This is the same shape made by bending the projecting plate 112 of the electrode plate 111 in the second embodiment.

Figure 20:
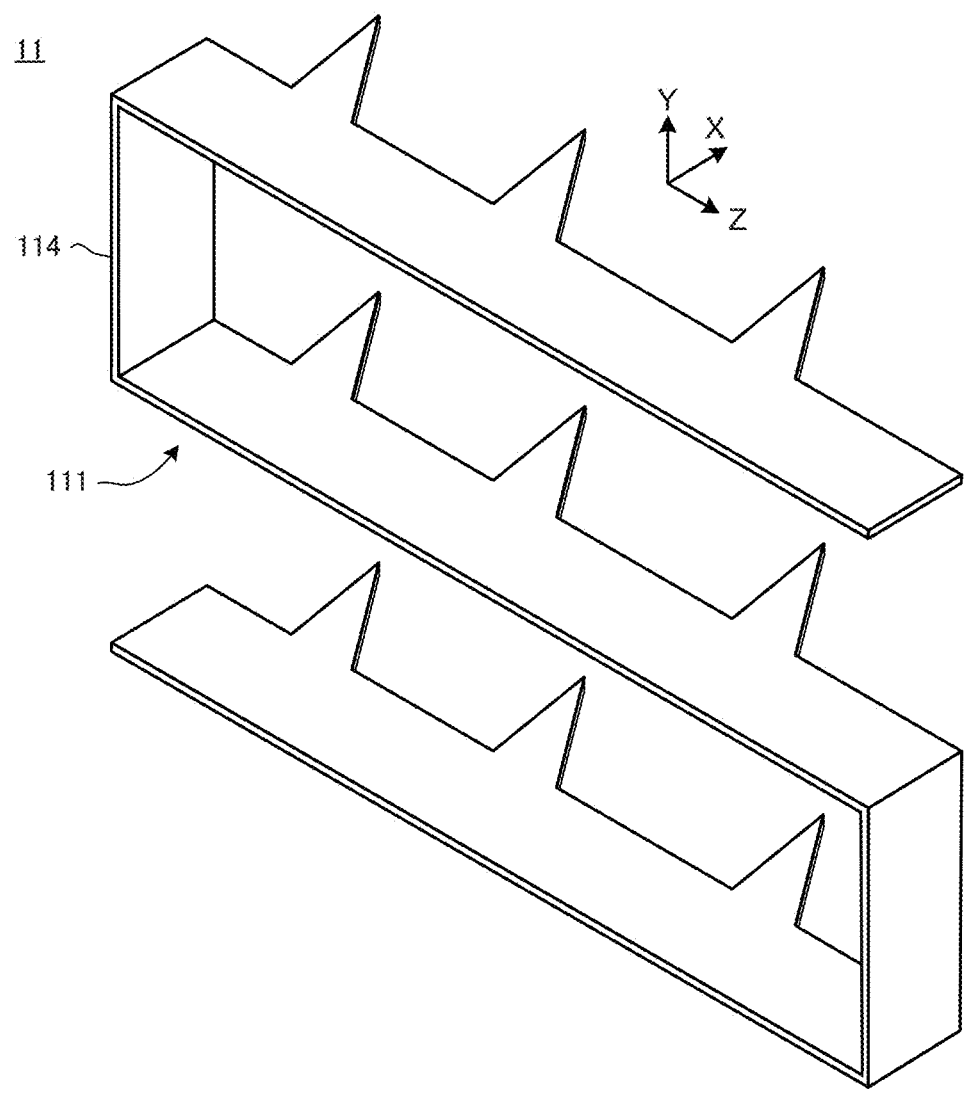
FIG. 20 is a perspective view illustrating an example of the discharge electrode 11.
Figure 21:
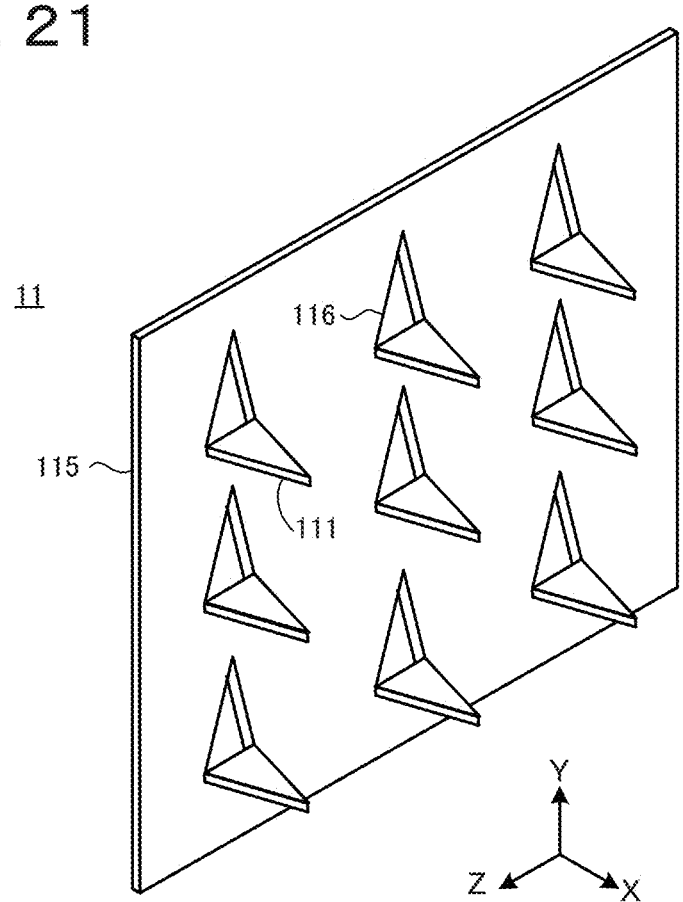
FIG. 21 is a perspective view illustrating an example of the discharge electrode 11.

FIG. 20, FIG. 21 are perspective views illustrating examples of the discharge electrode 11. A conductive (for example, metal) connecting member 114 can mechanically and electrically connect the plurality of electrode plates 111 in the Y-axis direction into a united discharge electrode 11.

The plurality of projecting plates 112 connected by a connector 115 may be formed by making a cut in and bending a conductive plate material (refer to FIG. 21). In this case, the gas flow AF can flow through an opening 116. Note that to decrease the ventilation resistance of the discharge electrode 11, it is preferable to decrease the area of the connector 115 (for example, to provide an opening).

Hereinafter, a manufacturing method of the discharge electrode 11 will be described. The electrode plate 111 illustrated in FIG. 16A to FIG. 16D can be produced by punching or laser machining from one conductive plate (metal plate). Between them, the punching is low in cost and suitable for mass production.

Figure 22:
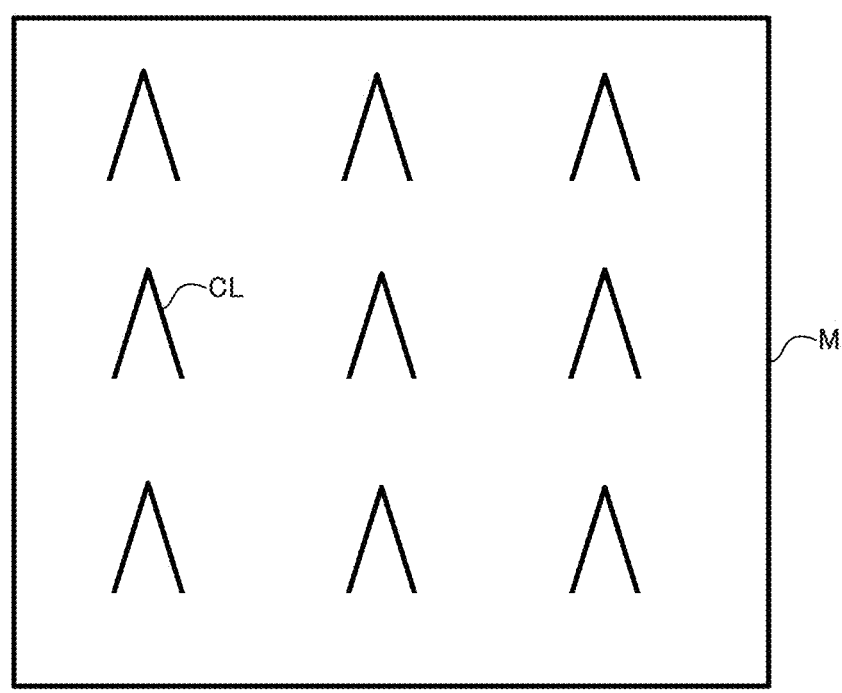
FIG. 22 is a plane view illustrating an example of the manufacturing method of the discharge electrode 11.

For the electrode plate 111 (the discharge electrode 11) illustrated in FIG. 17, FIG. 18A, FIG. 18B, FIG. 19, FIG. 20, after the punching, the projecting plates 112 or a part of them only need to be bent. The discharge electrode 11 illustrated in FIG. 21 can be produced by making a cut CL in and bending a conductive plate material M as has been described (refer to FIG. 22).

To generate plasma with uniform intensity from all of the projecting plates 112 as has been described, it is preferable to bring the plurality of projecting plates 112 to the same potential. To this end, the following measures can be employed.

Figure 23A:
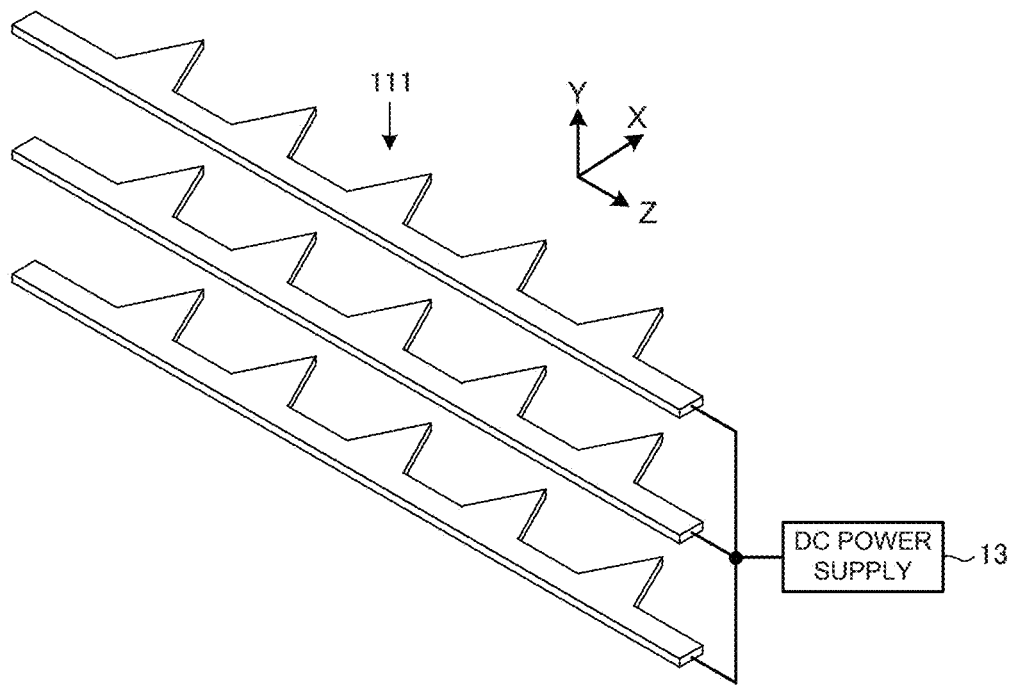
FIG. 23A is a perspective view illustrating an example of electrical connection of the electrode plates 111.

The plurality of electrode plates 111 are connected to one another by a conductive wire, and a voltage is applied thereto from one DC power supply 13 (refer to FIG. 23A).

Figure 23B:
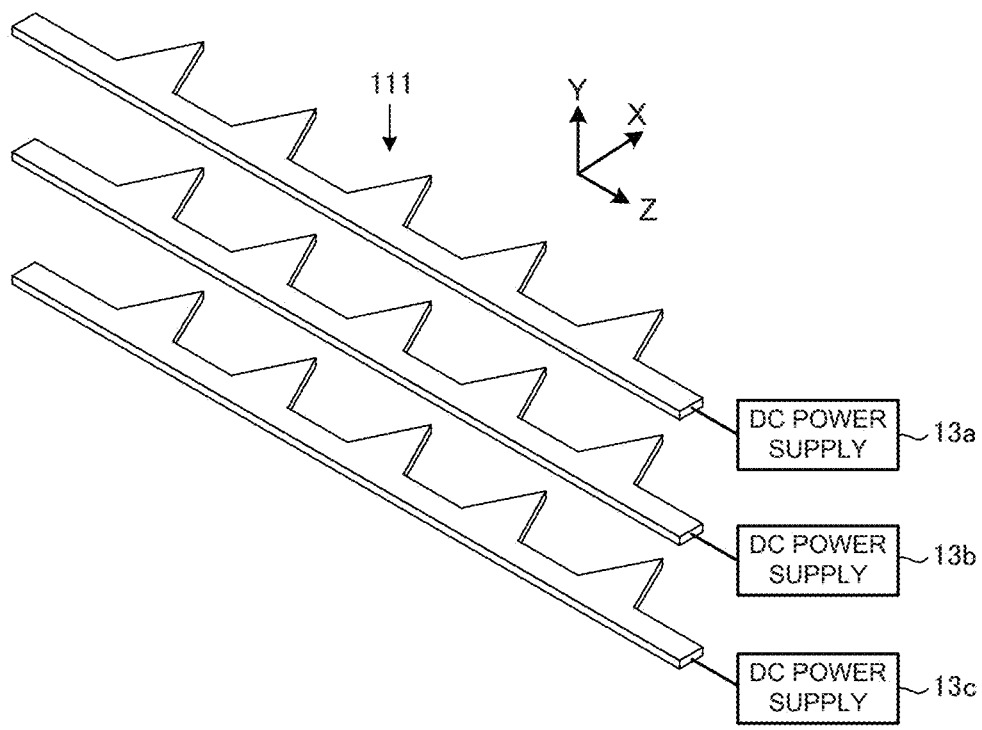
FIG. 23B is a perspective view illustrating an example of electrical connection of the electrode plates 111.

The same voltage is applied from a plurality of power supplies 13a to 13c to the plurality of electrode plates 111 (refer to FIG. 23B).

Figure 24A:
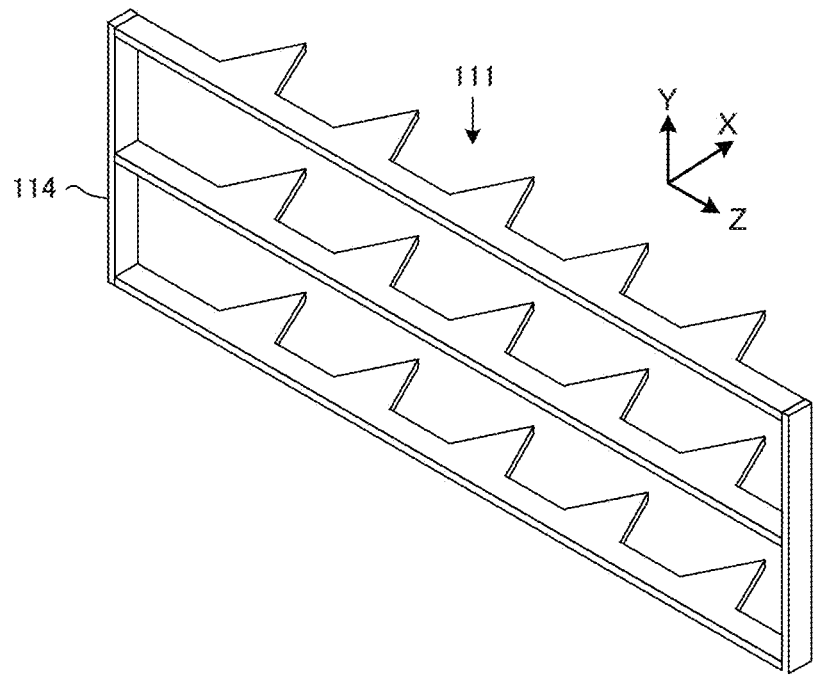
FIG. 24A is a perspective view illustrating an example of electrical connection of the electrode plates 111.
Figure 24B:
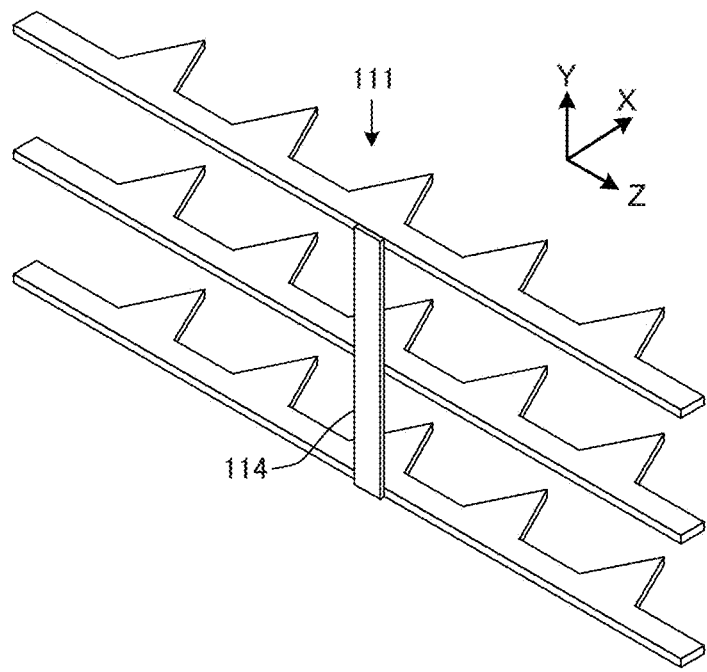
FIG. 24B is a perspective view illustrating an example of electrical connection of the electrode plates 111.

Side surfaces or back surfaces of the plurality of electrode plates 111 are connected to one another by a conductive connecting member (for example, a metal frame) 114 (refer to FIG. 24A, FIG. 24B).

The whole discharge electrode 11 is collectively produced from a conductive plate material (refer to FIG. 17 to FIG. 19).

Note that to enhance the strength of the discharge electrode 11, an insulating frame may be added as necessary.

(2) Shape of the Counter Electrode 12

Figure 25A:
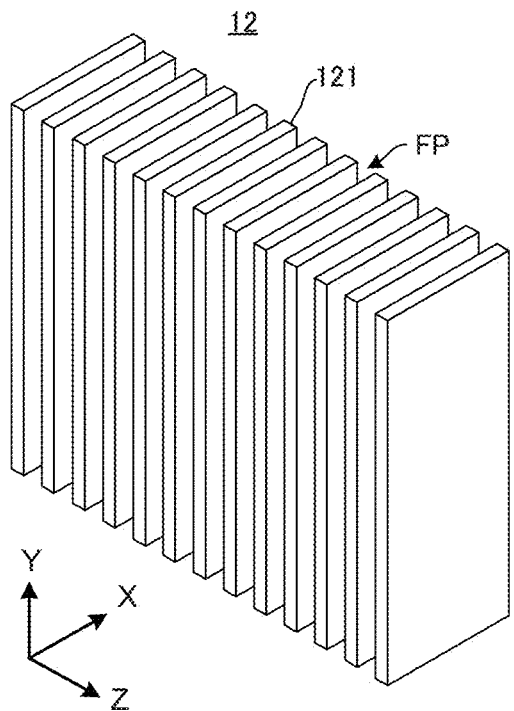
FIG. 25A is a perspective view illustrating an example of the counter electrode 12.
Figure 25B:
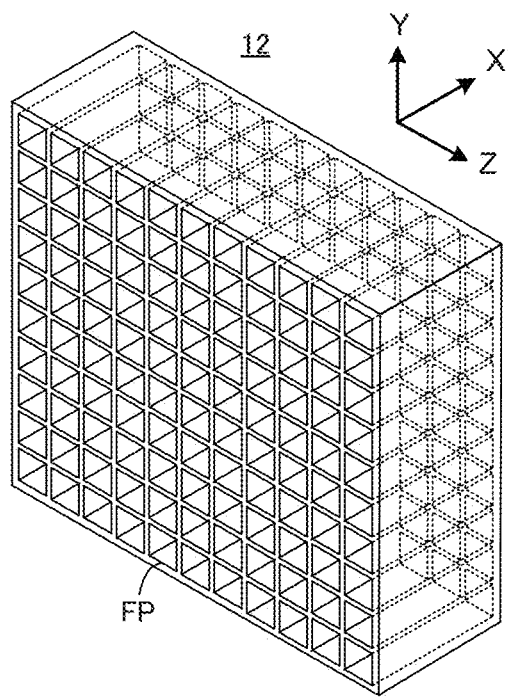
FIG. 25B is a perspective view illustrating an example of the counter electrode 12.
Figure 25C:
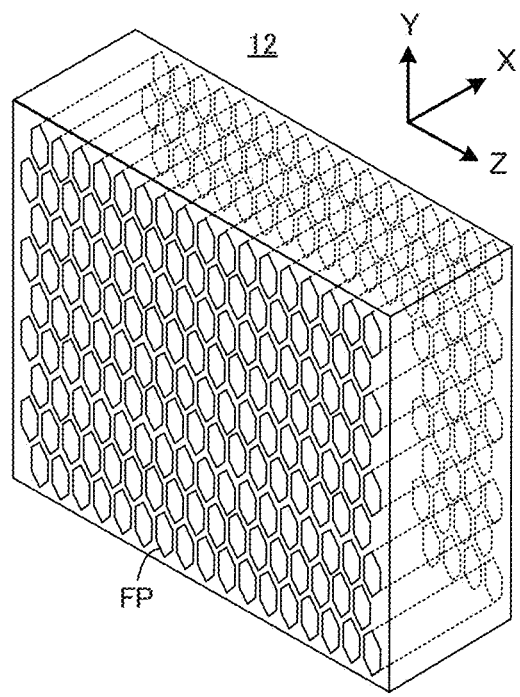
FIG. 25C is a perspective view illustrating an example of the counter electrode 12.

FIG. 25A to FIG. 25C are perspective views illustrating examples of the counter electrode 12. As in the embodiments, the counter electrode 12 can be formed in a fin shape (refer to FIG. 25A). In other words, the conductor plates 121 can be arranged side by side to form the counter electrode 12.

The counter electrode 12 may be in a mesh shape (refer to FIG. 25) or a honeycomb shape (refer to FIG. 25C). In other words, a block having rectangular prism or hexagonal prism through holes (the flow passage FP) is used as the counter electrode 12. The size and density of the through holes can be decided depending on the relation with the ventilation resistance.

Though not illustrated, the interval between or the height or shape of the ends 122 of at least part of the conductor plates 121 in the region A corresponding to the tip E of the discharge electrode 11 shall be different from that outside the region A (in the region B).

(Air Conditioner 20)

Figure 26:
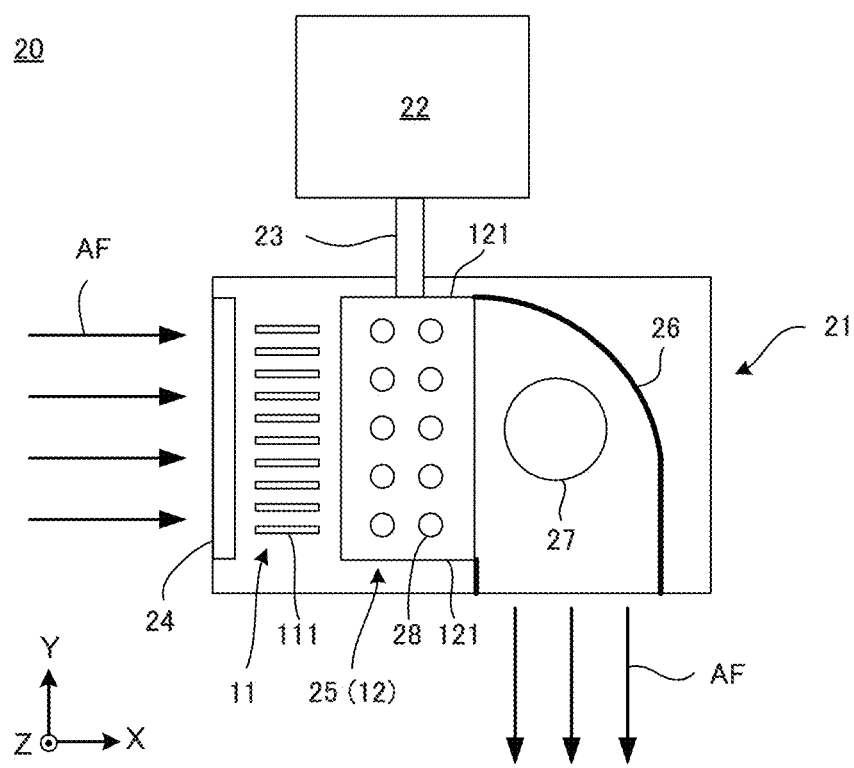
FIG. 26 is a schematic view illustrating a configuration of an air conditioner 20 according to an embodiment.

The electrical dust collector 10 can be installed in an air conditioner. FIG. 26 is a schematic view illustrating a configuration of an air conditioner 20 according to an embodiment. The air conditioner 20 has an indoor unit 21 and an outdoor unit 22. The indoor unit 21 and the outdoor unit 22 are connected to each other by a connector 23, and a coolant circulates between them. More specifically, the coolant is used to transfer heat from the indoor unit 21 to the outdoor unit 22 (air cooling) or in an opposite direction thereto (heating).

The indoor unit 21 has a filter 24, the discharge electrode 11, a heat exchanger 25, a partition wall 26, and a fan 27, and allows the gas flow AF to flow in and out. A combination of the discharge electrode 11 and the heat exchanger 25 of them functions as an electrical dust collector by applying a DC voltage thereto from a not-illustrated DC power supply.

The filter 24 filters and removes relatively large debris (dust) in the gas flow AF. The discharge electrode 11 is to charge relatively small dust in the gas flow AF, and the discharge electrode 11 in the first or second embodiment can be used.

The heat exchanger 25 exchanges heat between the gas flow AF and the coolant and traps the charged dust. In short, the heat exchanger 25 also functions as the counter electrode 12 of the electrical dust collector 10.

The heat exchanger 25 has a plurality of conductor plates 121 and a pipe 28. As has been described, the plurality of conductor plates 121 are arranged to be opposed to each other in the Z-direction. The conductor plates 121 are formed of a material excellent in electrical conductivity and heat conductivity (for example, metal) and connected to the pipe 28. Therefore, the conductor plates 121 exchange heat with the coolant in the pipe 28.

Between the discharge electrode 11 and the heat exchanger 25, a DC high voltage is applied. As a result, plasma is generated from the discharge electrode 11, the dust is charged and trapped by the conductor plates 121 in the heat exchanger 25.

The partition wall 26 is to change the direction of the gas flow AF flowing out of the heat exchanger 25. In a space partitioned by the partition wall 26, the fan 27 is installed to form the gas flow AF directing from the filter 24 to the heat exchanger 25. As described above, the air conditioner 20 has a dust collecting function as well as an air conditioning function.

As described above, the interval between or the height or shape of the ends 122 of the counter electrode 12 (the dust collecting electrode) in the region A corresponding to the tip E of the discharge electrode 11 is made different from that outside the region A (in the region B) in the above embodiments. As a result, it becomes possible to achieve both the improvement in collection efficiency of particles having a small diameter (for example, PM0.1 further smaller and lighter than PM2.5) and the suppression of an increase in pressure loss.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A dust collector, comprising:
   a discharge electrode having tips;
   a counter electrode comprising a plurality of conductor plates each having a plurality of ends opposed to the discharge electrode and arranged side by side in a plate thickness direction; and
   a power supply that applies a voltage between the discharge electrode and the counter electrode,
   wherein the counter electrode has a first region closer to the tips and a second region farther from the tips than the first region, and
   wherein at least a part of the plurality of ends in the first region is different from at least a part of the plurality of ends in the second region with respect to at least one of: an interval, a distance from the tips, or a shape.

2. The dust collector according to claim 1,
   wherein heights of two adjacent ends in the first region are different from each other.

3. The dust collector according to claim 2,
   wherein heights of the plurality of ends in the first region alternately increase.

4. The dust collector according to claim 2,
   wherein heights of the plurality of ends in the first region increase or decrease sequentially from a predetermined place in the first region.

5. The dust collector according to claim 4,
   wherein the heights of the plurality of ends in the first region have periodicity in the plate thickness direction.

6. The dust collector according to claim 2, wherein a relation between a difference in the heights of the two adjacent ends, $\Delta H$, and an interval between the conductor plates, $D$, is expressed as:

$$0.27 \leq \Delta H/D \leq 3.7.$$

7. The dust collector according to claim 1,
wherein the interval between the plurality of ends in the first region is smaller than the interval between the plurality of ends in the second region.

8. The dust collector according to claim 1,
wherein one or more of the plurality of ends in the first region are sharper than one or more of the plurality of ends in the second region.

9. The dust collector according to claim 1, wherein a width of the first region is smaller than a width of the second region by 2 mm.

10. The dust collector according to claim 1,
wherein the discharge electrode discharges by the voltage applied thereto, and
wherein the counter electrode collects dust charged by a discharge of the discharge electrode.

11. An air conditioner comprising the dust collector according to claim 1.

* * * * *